(12) United States Patent
DeMyer

(10) Patent No.: US 10,087,084 B2
(45) Date of Patent: Oct. 2, 2018

(54) AUTOMATIC FLOW CONTROL BASED ON SENSED EFFECTIVENESS INDICATORS TO PRODUCE EFFECTIVELY TREATED WATER WITH A PORTABLE WATER TREATMENT UNIT

(71) Applicant: Roving Blue, Inc., Lena, WI (US)

(72) Inventor: Marianna DeMyer, Lena, WI (US)

(73) Assignee: Roving Blue, Inc., Lena, WI (US)

( * ) Notice: Subject to any disclaimer, the term of this patent is extended or adjusted under 35 U.S.C. 154(b) by 566 days.

(21) Appl. No.: 14/673,176

(22) Filed: Mar. 30, 2015

(65) Prior Publication Data

US 2016/0289085 A1  Oct. 6, 2016

(51) Int. Cl.
*C02F 1/00* (2006.01)
*G05B 19/00* (2006.01)
(Continued)

(52) U.S. Cl.
CPC .............. *C02F 1/002* (2013.01); *C02F 1/78* (2013.01); *C02F 1/283* (2013.01); *C02F 1/505* (2013.01);
(Continued)

(58) Field of Classification Search
CPC .. C02F 1/00; C02F 1/002; C02F 1/283; C02F 1/505; C02F 1/76; C02F 1/78; C02F 2209/003; C02F 2001/46147; C02F 2101/20; C02F 2201/008; C02F 2201/782; C02F 2209/005; C02F 2209/006; C02F 2209/04; C02F 2209/23; C02F 2209/40; C02F 2303/24; C02F 1/008; C02F 1/42; C02F 1/4674; C02F 1/66; C02F 1/68; C02F 1/686; C02F 9/00; C02F 9/08; C02F 9/12; C02F 2103/34; A61L 2/24; A61M 1/16;
(Continued)

(56) References Cited

U.S. PATENT DOCUMENTS 6,182,453 B1   2/2001  Forsberg
7,125,485 B2  10/2006  Hanbli
(Continued)

OTHER PUBLICATIONS

Electrolytic Ozone, Inc., ADEPT™ 500 System Development Module, User Manual, Sep. 2010, Electrolytic Ozone, Inc.
Electrolytic Ozone, Inc., EOI Dissolved Ozone Development Kit (Model DODK-12V), User Manual, Unknown Date, Electrolytic Ozone, Inc.
Electrolytic Ozone, Inc., ADEPT™ 50 System Development Module, User Manual, Sep. 2010, Electrolytic Ozone, Inc.

*Primary Examiner* — Hayden Brewster
(74) *Attorney, Agent, or Firm* — Jensen-Haxel Law

(57) ABSTRACT

Disclosed are a method, a device and a system of automatic flow control based on sensed effectiveness indicators to produce effectively treated water with a portable water treatment unit. In one or more embodiments, a chemical treatment unit delivers a treatment chemical to water as the water flows at a flow rate induced by a pump capable of operating at multiple speeds. A sensor downstream of the chemical treatment unit measures an effectiveness indicator and a processor and/or a feedback circuit determines an effectiveness of the chemical treatment. A controller changes power to the pump in response to the determination, adjusting the flow rate to ensure efficient usage of a power source and/or to ensure effective production of potable water. One or more filters may be included, each having a bypass valve, and the pump may automatically adjust to changing filter configurations and/or source water composition.

17 Claims, 11 Drawing Sheets

Portable Water Treatment Unit 100

(51) Int. Cl.
*C02F 1/78* (2006.01)
*G05B 21/00* (2006.01)
*B01J 49/00* (2017.01)
*C02F 1/28* (2006.01)
*C02F 1/50* (2006.01)
*C02F 1/76* (2006.01)
*C02F 1/461* (2006.01)
*C02F 101/20* (2006.01)

(52) U.S. Cl.
CPC ...... *C02F 1/76* (2013.01); *C02F 2001/46147* (2013.01); *C02F 2101/20* (2013.01); *C02F 2201/008* (2013.01); *C02F 2201/782* (2013.01); *C02F 2209/003* (2013.01); *C02F 2209/005* (2013.01); *C02F 2209/006* (2013.01); *C02F 2209/04* (2013.01); *C02F 2209/23* (2013.01); *C02F 2209/40* (2013.01); *C02F 2303/24* (2013.01); *Y02A 20/214* (2018.01); *Y02W 10/37* (2015.05)

(58) Field of Classification Search
CPC ............ B01D 17/0214; B01D 17/0217; B01D 53/50; B01D 53/502; B01D 53/504; B01D 53/73; B01J 49/00; B01J 49/0095

USPC ... 210/96.1, 97, 98, 138, 143, 239, 739, 746
See application file for complete search history.

(56) References Cited

U.S. PATENT DOCUMENTS

| | | | |
|---|---|---|---|
| 7,229,550 | B2 | 6/2007 | Haase |
| 7,744,765 | B2 | 6/2010 | Bjerkan et al. |
| 7,943,087 | B2 | 5/2011 | McGuire et al. |
| 8,226,832 | B2 | 7/2012 | Angelilli et al. |
| 8,597,507 | B2 | 12/2013 | Korzeniowski |
| 8,808,537 | B1 | 8/2014 | Livingston |
| 2010/0292844 | A1* | 11/2010 | Wolf ........................ C02F 9/00 700/271 |
| 2011/0210049 | A1 | 9/2011 | O'Regan, Jr. |
| 2011/0226605 | A1* | 9/2011 | Thiers ................... B01D 1/305 203/10 |
| 2012/0292261 | A1 | 11/2012 | Fleck |
| 2013/0193079 | A1 | 8/2013 | Booth et al. |
| 2013/0206604 | A1 | 8/2013 | Lutz et al. |
| 2013/0313191 | A1 | 11/2013 | Wolf et al. |
| 2015/0374895 | A1* | 12/2015 | Friederichs ............. C02F 1/283 210/87 |
| 2016/0060135 | A1* | 3/2016 | Huang ................... C02F 1/008 210/652 |

* cited by examiner

FIG. 1  Portable Water Treatment Unit 100

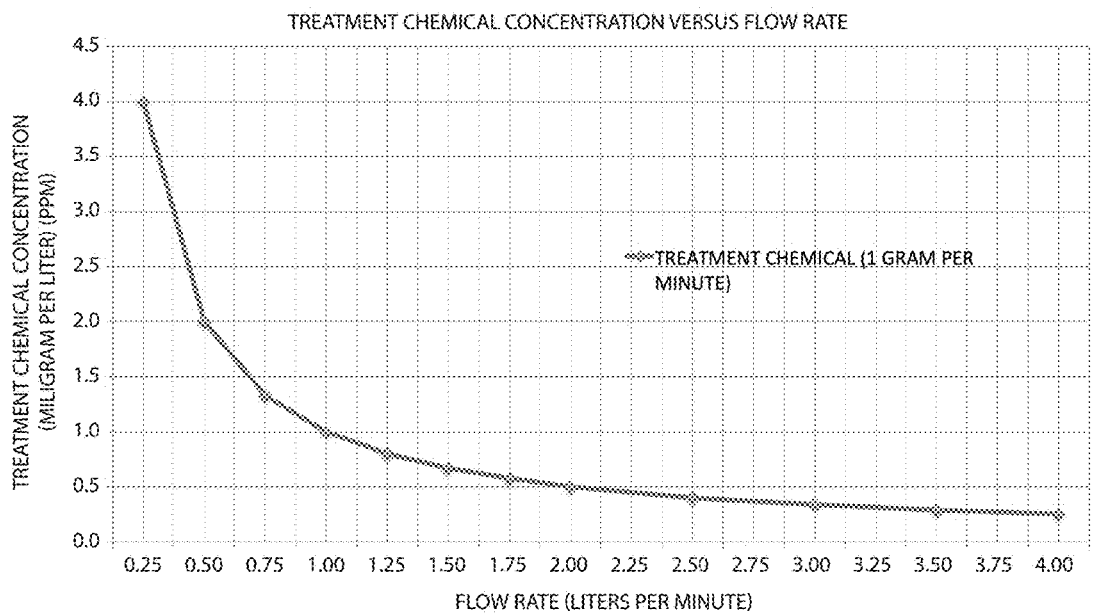
FIG. 4A General Calibration Curve 450A
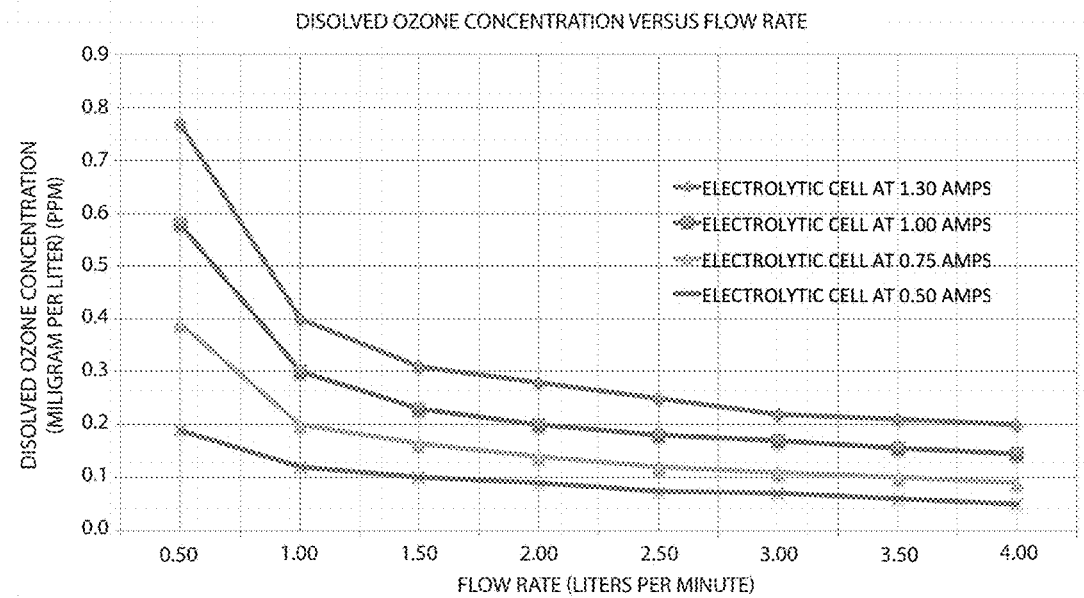
FIG. 4B Electrolytic Calibration Curve 450B

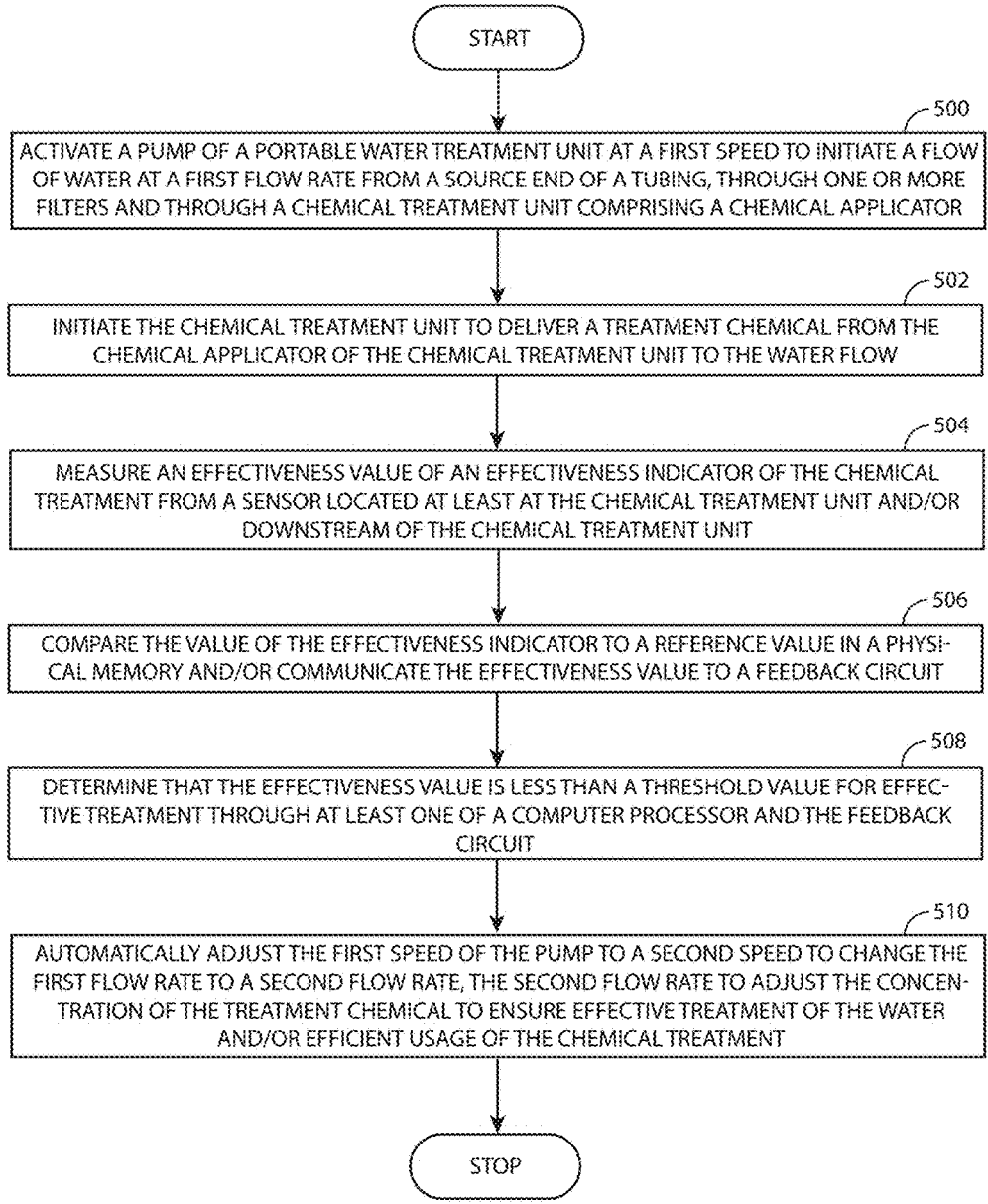
FIG. 5   Water Treatment Process Flow 550

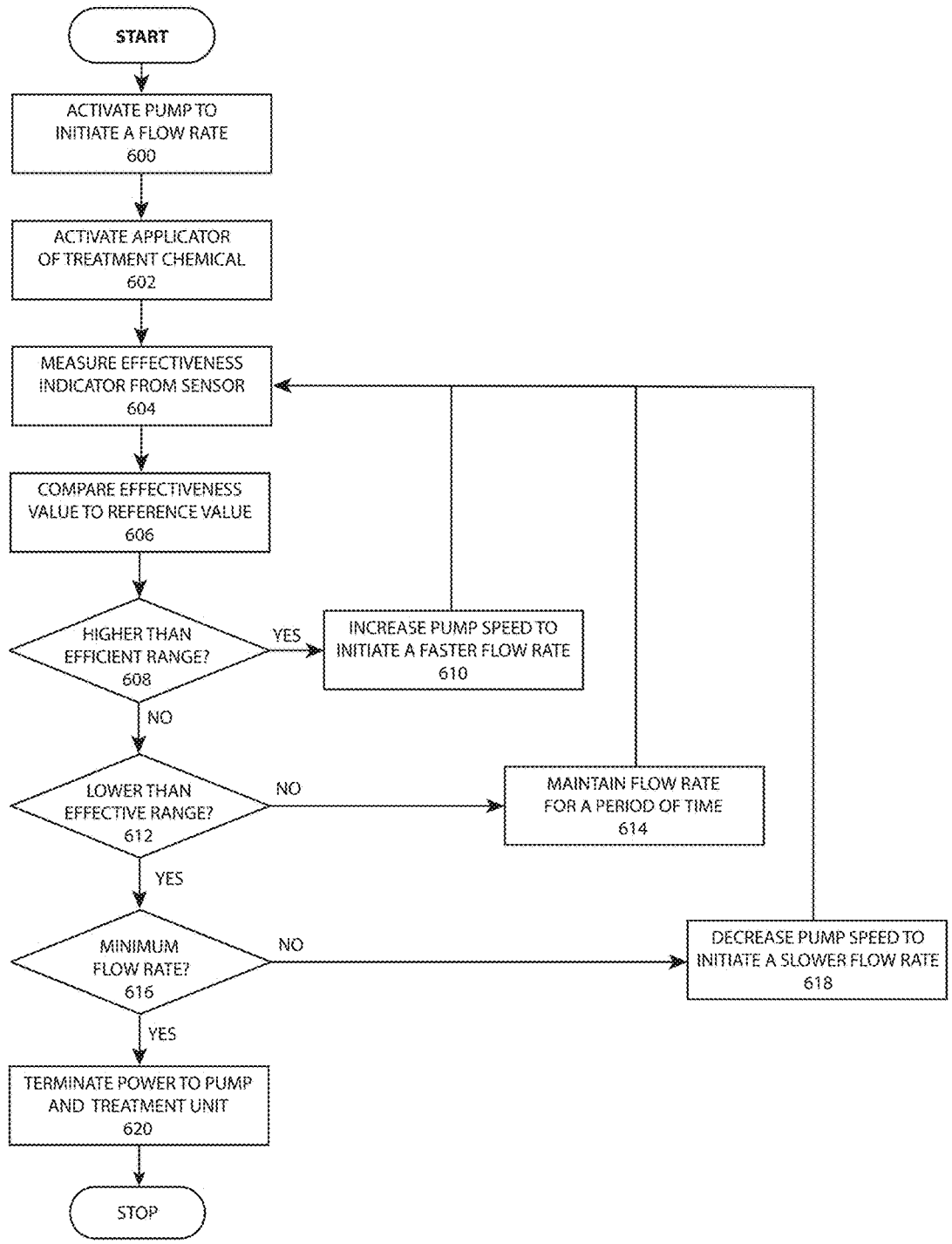
FIG. 6   Water Treatment Process Flow 650

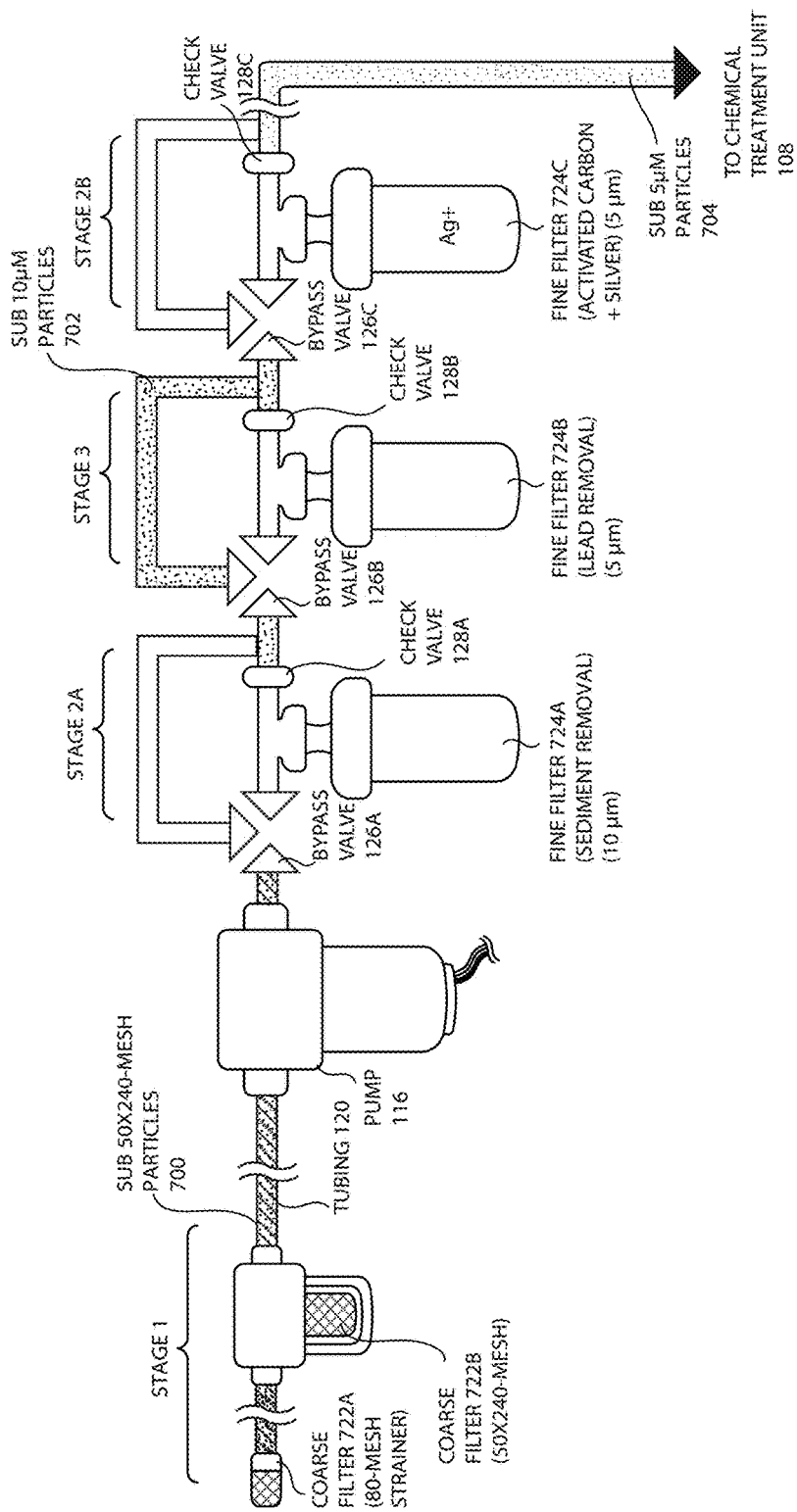
FIG. 7  Filter and Filter Bypass View 750

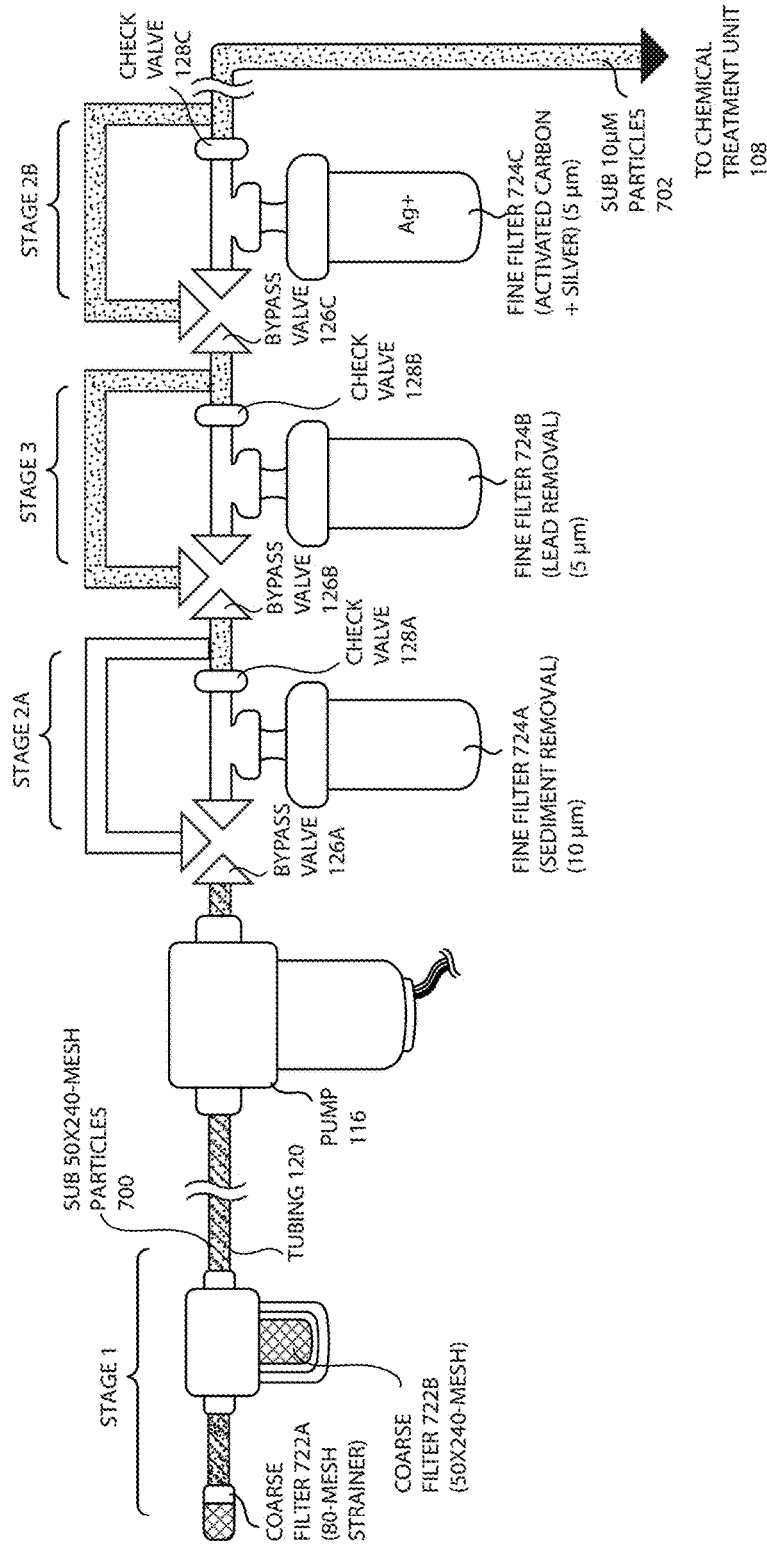
FIG. 8   Filter and Filter Bypass View 850

Ozonation Control Circuit 900

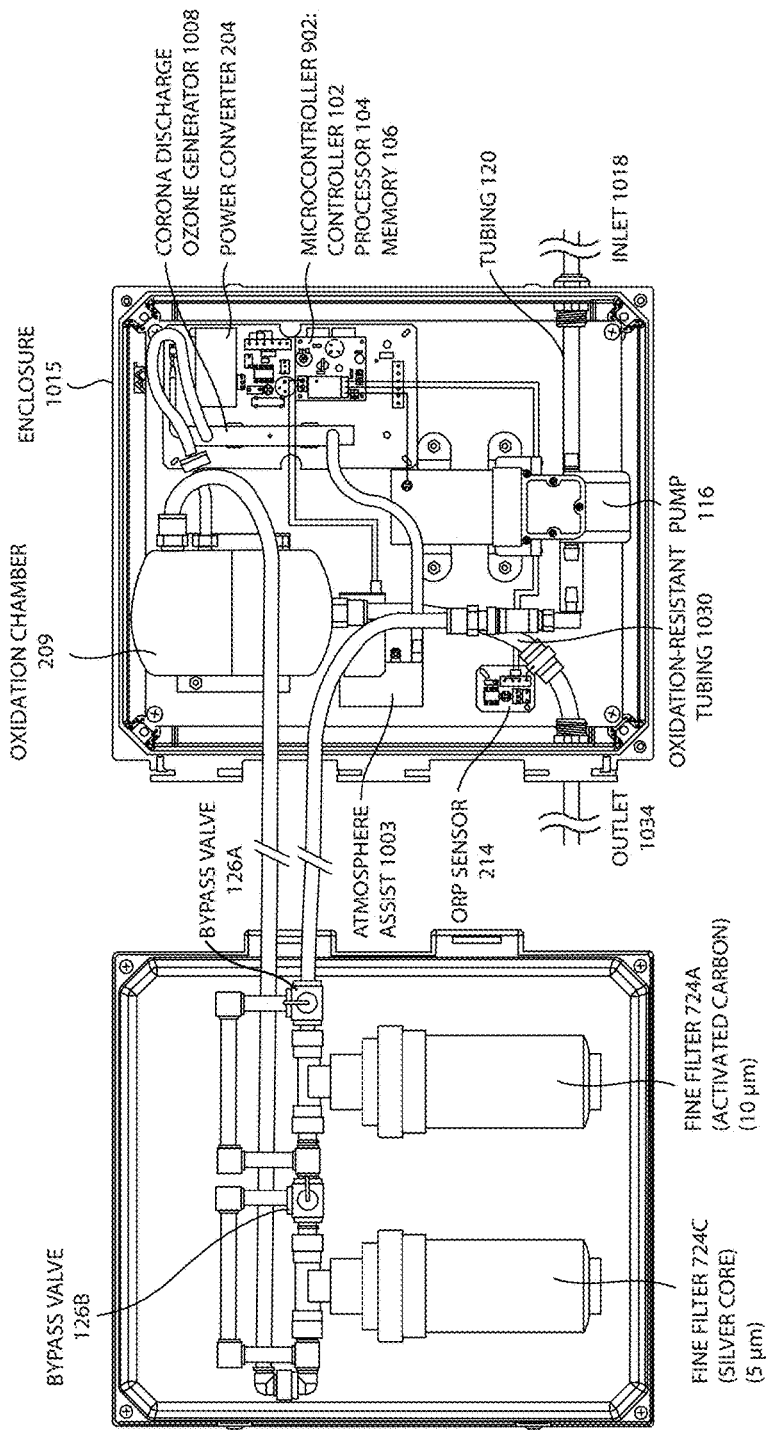
FIG. 10    Portable Ozonation Unit 1000

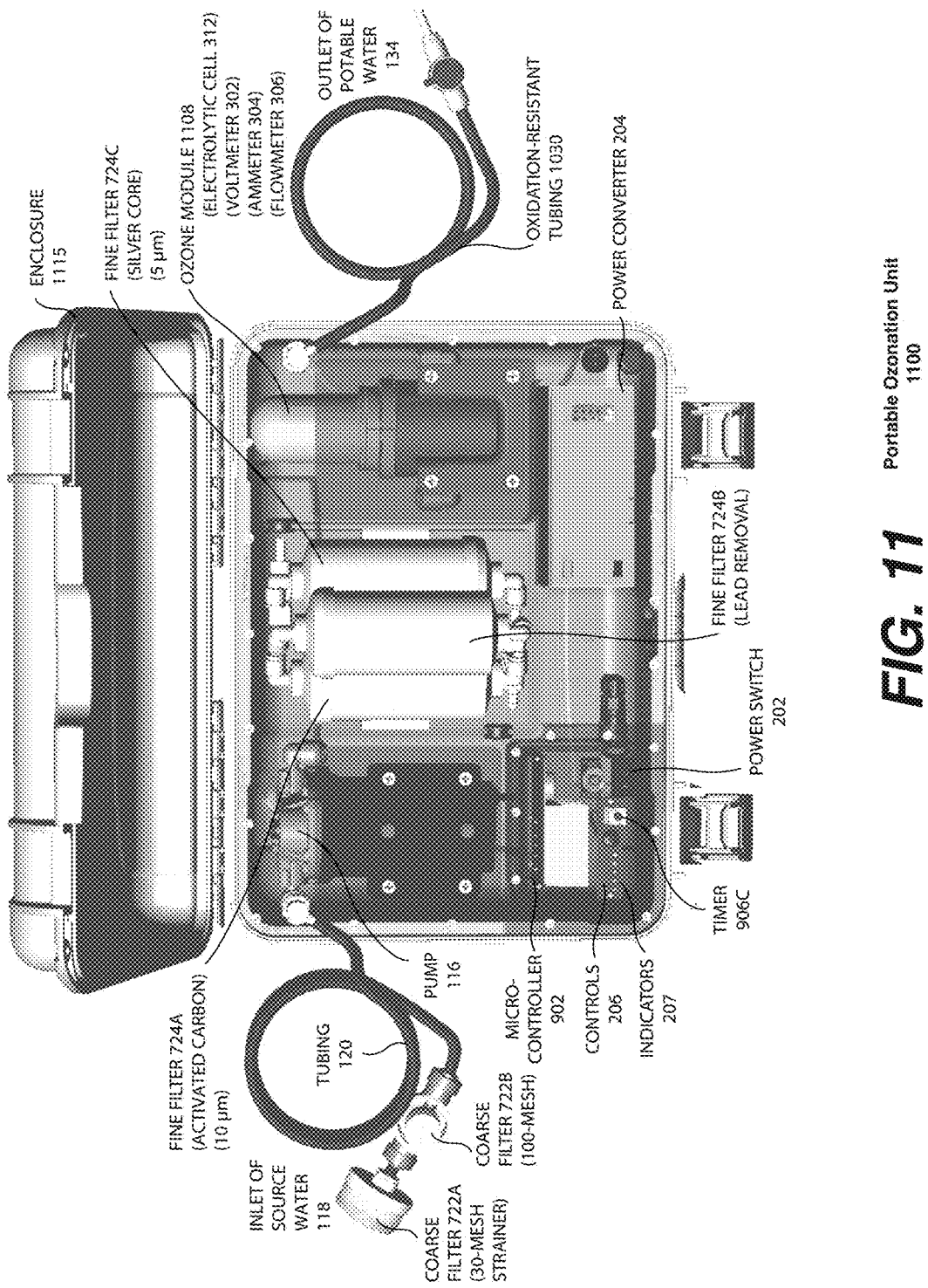
FIG. 11  Portable Ozonation Unit 1100

AUTOMATIC FLOW CONTROL BASED ON SENSED EFFECTIVENESS INDICATORS TO PRODUCE EFFECTIVELY TREATED WATER WITH A PORTABLE WATER TREATMENT UNIT

FIELD OF TECHNOLOGY

This disclosure relates generally to water treatment and, more particularly, to a method, a device and/or a system of automatic flow control based on sensed effectiveness indicators to produce effectively treated water with a portable water treatment unit.

BACKGROUND

Clean water may be difficult to find in locations that are remote such as wilderness, in places that lack adequate infrastructure such as developing nations, and during emergencies such as natural disasters. On-site potable water production may be important for people ranging from recreational hikers to villagers in developing nations, and to organizations such as the United States military or non-profit humanitarian organizations. For example, the ability for military and non-profit missions to produce on-site water may prolong mission time, ease logistical burdens, increase mission flexibility, and/or reduce risks associated with overland and airlift supply chains. In addition, some locations may be so remote that the location cannot be reached by vehicle or boat, because the water is too heavy, and expensive to transport to the location.

Current water treatment systems may have several deficiencies relative to the operating conditions of varied and/or dynamic environments. Some water treatment systems may still be designed and configured for a relatively static environment, and therefore may not be able to adjust to rapidly changing conditions or variable water composition. It may take considerable time and/or skill to reconfigure a water treatment device from treating one primary contaminant such as a pathogenic microorganism to another, such as a heavy metal. To accommodate several kinds of water sources, some systems may become complex or build in overlapping modules that may make the system heavy and/or difficult to transport. Such systems may have a large number of moving parts and/or components that may make them difficult to service and/or repair, especially in a rural location. For example, a system driven by a pump may have a chemical treatment applicator that controls an amount and/or a rate of a treatment chemical added to water. This applicator may have difficulty adding a correct amount of the chemical treatment where a flow rate change due to such factors as the pump failing or one or more filters clogging, impeding water flow. Similarly, current systems may not balance treatment effectiveness with power consumption when power conservation may be important for locations of limited infrastructure.

On the other hand, small systems may provide only a limited number of people (e.g., one person or a few people) with a single mode of treatment that may limit the source water that they can consume. For example, a filtering system may eliminate harmful bacteria like but not be able to destroy toxins such as those produced by algal blooms. Chemical treatment systems that may otherwise destroy such toxins and be useful for a wide variety of other treatments may tend to be bulky due to added overhead in controlling the application of the chemical application and other systems to ensure effective water treatment.

As a result, people outside of functioning infrastructure or in locations may not have sufficient access to clean water. Treatment systems that cannot be easily and/or automatically adjusted to available water sources may put people at risk of dehydration or illness. For military and humanitarian operations, mission time may be reduced and water may have to be supplied using methods that are risky and/or resource-intensive.

SUMMARY

Disclosed are a method, a device and/or a system of automatic flow control based on sensed effectiveness indicators to produce effectively treated water with a portable water treatment unit. The portable water treatment unit provides potable water by employing a chemical treatment, and in one or more preferred embodiments, ozone gas. The portable water treatment unit may be able to quickly and easily adjust to dynamic environments, and a variety of field conditions and/or source waters by automatically controlling the power supplied to a pump to adjust a flow rate based upon effectiveness indicators as measured by one or more sensors. The result is a relatively small water treatment unit (e.g., the unit may be man-portable) that can be deployed to treat source water from many different environments and convert the source water to potable water for safe human consumption and/or medical use.

In one embodiment, a portable water treatment system includes a pump connected to a tubing and capable of operating at multiple speeds to draw water at multiple flow rates through a source end of the tubing to a product end of the tubing. A chemical treatment unit is connected to an interstitial section of the tubing, the chemical treatment unit including a chemical applicator used to deliver a treatment chemical to the water as the water flows through the tubing and past the chemical treatment unit at a flow rate induced by the pump. A sensor is connected to the tubing and located at the chemical treatment unit and/or downstream of the chemical treatment unit to measure an effectiveness value of an effectiveness indicator of the chemical treatment. A processor and/or a feedback circuit communicatively coupled to the sensor is used to compare the effectiveness value of the effectiveness indicator to a reference value to determine an effectiveness of the chemical treatment added to the water by the portable water treatment system.

A controller communicatively coupled to the processor and/or the feedback circuit is used to adjust the flow rate of the pump. The flow rate of the pump is adjusted in response to the determination of the effectiveness of the chemical treatment in the water by the at least one of the processor and the feedback circuit. A power source of the portable water treatment system is connected to and provides power to the pump, the processor, the feedback circuit, the chemical treatment unit, and/or the controller.

The chemical treatment may be ozone and the chemical treatment unit may be an ozone generator that dissolves ozone in the water flow passing the ozone generator. Specifically, the ozone generator may be an electrolytic cell utilizing a diamond material in an anode and/or a cathode of the electrolytic cell. The effectiveness indicator, as measured during operation of the electrolytic cell, may be a current of the electrolytic cell and a voltage of the electrolytic cell. The sensor may also be integrated into the chemical treatment unit and the effectiveness indicator can be a communication associated with an operational metric of the chemical treatment unit. To protect potentially delicate components, an external housing, which may be rugged such that it meet certain military specifications, can enclose the pump, the chemical treatment unit, the processor and/or the feedback circuit, and the controller.

The sensor may be ozone concentration sensor and/or an oxidation-reduction potential probe and the effectiveness indicator may be an ozone concentration and/or an oxidation-reduction potential of the water flowing past the sensor. One or more fine filters may be connected to the tubing upstream of the chemical treatment unit. For operational flexibility, a number of bypass valves may route the water flow around at least one of the fine filters. The portable water treatment unit may automatically adjust to a new flow rate and/or a new water composition based on a new filter configuration.

An oxidation chamber may be connected to the tubing and receive ozone of the ozone generator through a venturi aided by the water flow and/or an atmosphere assist providing a positive air pressure to aid in dissolving ozone in the water. The sensor may be located at the chemical treatment unit and/or may be located in the oxidation chamber.

In another embodiment, a pump is connected to a tubing and is capable of operating at multiple speeds to draw water at multiple flow rates through a source end of the tubing to a product end of the tubing. An electrolytic cell for generating ozone is connected to an interstitial section of the tubing and used for delivering an ozone treatment to the water as the water flows through the tubing and past the electrolytic cell at a flow rate induced by the pump. A sensor connected to the tubing located at the electrolytic cell and/or downstream of the electrolytic cell measures an effectiveness value of an effectiveness indicator of the ozone treatment.

A microcontroller that includes a processor and a memory is communicatively coupled to the sensor and the pump. The microcontroller compares the effectiveness value of the effectiveness indicator to a reference value stored in the memory of the microcontroller to determine an effectiveness of the ozone treatment added to the water by the electrolytic cell. After processing the effectiveness value, the microcontroller adjusts the flow rate of the pump in response to the determination of the effectiveness of the ozone treatment in the water. The microcontroller makes the determination by comparing the effectiveness value to the reference value. Finally, a power source of the portable water treatment system is connected to and provides power to the pump, the processor, the feedback circuit, the electrolytic cell, and/or the controller.

An anode of the electrolytic cell may be a cathode of the electrolytic cell that includes a doped diamond material. During operation of the electrolytic cell the effectiveness indicator may be a current of the electrolytic cell and a voltage of the electrolytic cell. The sensor may also be integrated into the chemical treatment unit, in which case the effectiveness indicator can be a communication associated with an operational metric of the chemical treatment unit. The microcontroller may further be operable to determine a current voltage of the power source and disable the pump when the current voltage of the power source is below a threshold voltage.

In yet another embodiment, a method for treating water utilizing a portable water treatment unit begins by activating a pump of the portable water treatment unit at a first speed, were the pump is capable of operating at multiple speeds. The first speed initiates a flow of water at a first flow rate from a source end of a tubing, through one or more filters, and additionally through a chemical treatment unit that includes a chemical applicator. The chemical treatment unit is initiated to deliver a treatment chemical from the chemical applicator of the chemical treatment unit to the water flow. An effectiveness value of an effectiveness indicator of the chemical treatment is then measured from a sensor that is located at the chemical treatment unit and/or downstream of the chemical treatment unit. The method then compares the value of the effectiveness indicator to a reference value in a physical memory and/or communicates the effectiveness value to a feedback circuit. It is determined through the computer processor and/or the feedback circuit that the effectiveness value is less than a threshold value for effective treatment by the water treatment unit. The first speed of the pump is then automatically adjusted to a second speed to change the first flow rate to a second flow rate. The second flow rate adjusts the concentration of the treatment chemical to ensure the effective treatment of the water and/or efficient usage of the chemical treatment and/or the power source.

The chemical treatment unit may be an ozone generator, the ozone generator may be an electrolytic cell for producing ozone, and an anode of the electrolytic cell may be made of a boron-doped diamond material. The sensor may be an operational sensor integrated into the chemical treatment unit that utilizes a communication associated with an operational metric of the chemical treatment unit as the effectiveness indicator. In addition, the sensor may also be an oxidation-reduction potential probe utilizing an oxidation-reduction potential of the water flowing past the sensor as the effectiveness indicator. Similarly, an ozone concentration sensor may be used, thus utilizing an ozone concentration as the effectiveness indicator. A constant current may be supplied to the electrolytic cell to maintain a fixed ozone production rate for the anode and/or the cathode of the electrolytic cell.

The portable water treatment unit may need to adjust to dynamic field conditions or waters of several compositions. Therefore, in response to flow rate change from utilization of a bypass valve routing water around one or more fine filters, or lower the controller may automatically adjust the second speed of the pump to a third speed, changing the second flow rate to a third flow rate. The third flow rate may adjust the concentration of the treatment chemical to ensure the effective treatment of the water and/or efficient usage of the chemical treatment in the new bypass configuration. Similarly, the portable water treatment unit may encounter higher or law amounts of impurities in the water, and may automatically adjust the flow rate to ensure the effective treatment of the water and/or efficient usage of the chemical treatment when the new water composition is encountered.

The methods and systems disclosed herein may be implemented in any means for achieving various aspects, and may be executed in a form of a non-transitory machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this specification are illustrated by way of example and not limitation in the figures of the accompanying drawings, in which like references indicate similar elements and in which:

FIG. 4A is an example of a general calibration curve that may be utilized in calibrating the portable water treatment unit to appropriately change the power supplied to the pump in response to the effectiveness indicator, according to one or more embodiments.

FIG. 4B is a calibration curve that may be utilized in calibrating the controller of the portable ozonation unit utilizing an electrolytic cell to appropriately change the power supplied to the pump in response to the effectiveness indicator that is a voltage and/or amperage of the electrolytic cell, according to one or more embodiments.

FIG. 5 is a water treatment process flow illustrating a process in which the flow rate of the portable water treatment unit is automatically adjusted to produce potable water, according to one or more embodiments.

FIG. 6 is another water treatment process flow illustrating a process by which the effectiveness value may be compared against predetermined values stored in a memory of the controller and/or designed into the feedback circuit of the controller, according to one or more embodiments.

FIG. 7 is a filter and filter bypass view illustrating a number of filters that may be used in the portable water treatment unit along with bypass valves that can easily combine various filters and/or bypass inoperable or unnecessary filters to quickly adjust to various field conditions, the controller of FIG. 1 automatically adjusting power to the pump to account for changing flow resistance and/or composition of the source water that may change based on filter usage, according to one or more embodiments.

FIG. 8 is another filter and filter bypass view illustrating usage of the bypass valves to adjust to a specific environmental challenge, adapt to a filter that has reached capacity, and/or to conserve a low energy source, according to one or more embodiments.

FIG. 10 is a specific instance of the portable ozonation unit of FIG. 2 including an enclosure, two fine filters each having a bypass valve, an ozone generator with an atmosphere assist and an oxidation chamber, and an oxidation-reduction potential sensor communicatively coupled to a microcontroller, according to one or more embodiments.

FIG. 11 a specific instance of the portable ozonation unit of FIG. 3 having three fine filters mounted inside a ruggedized enclosure and utilizing the circuit diagram of FIG. 9 and an ozone module that utilizes as the ozone generator the electrolytic cell further including the voltmeter, the ammeter, the flowmeter and one or more operational sensors, according to one or more embodiments.

Other features of the present embodiments will be apparent from the accompanying drawings and from the detailed description that follows.

DETAILED DESCRIPTION

Disclosed are a method, a device, a system and/or a manufacture of automatic flow control based on sensed effectiveness indicators to produce effectively treated water with a portable water treatment unit. Although the present embodiments have been described with reference to specific example embodiments, it will be evident that various modifications and changes may be made to these embodiments without departing from the broader spirit and scope of the various embodiments.

Figure 1:
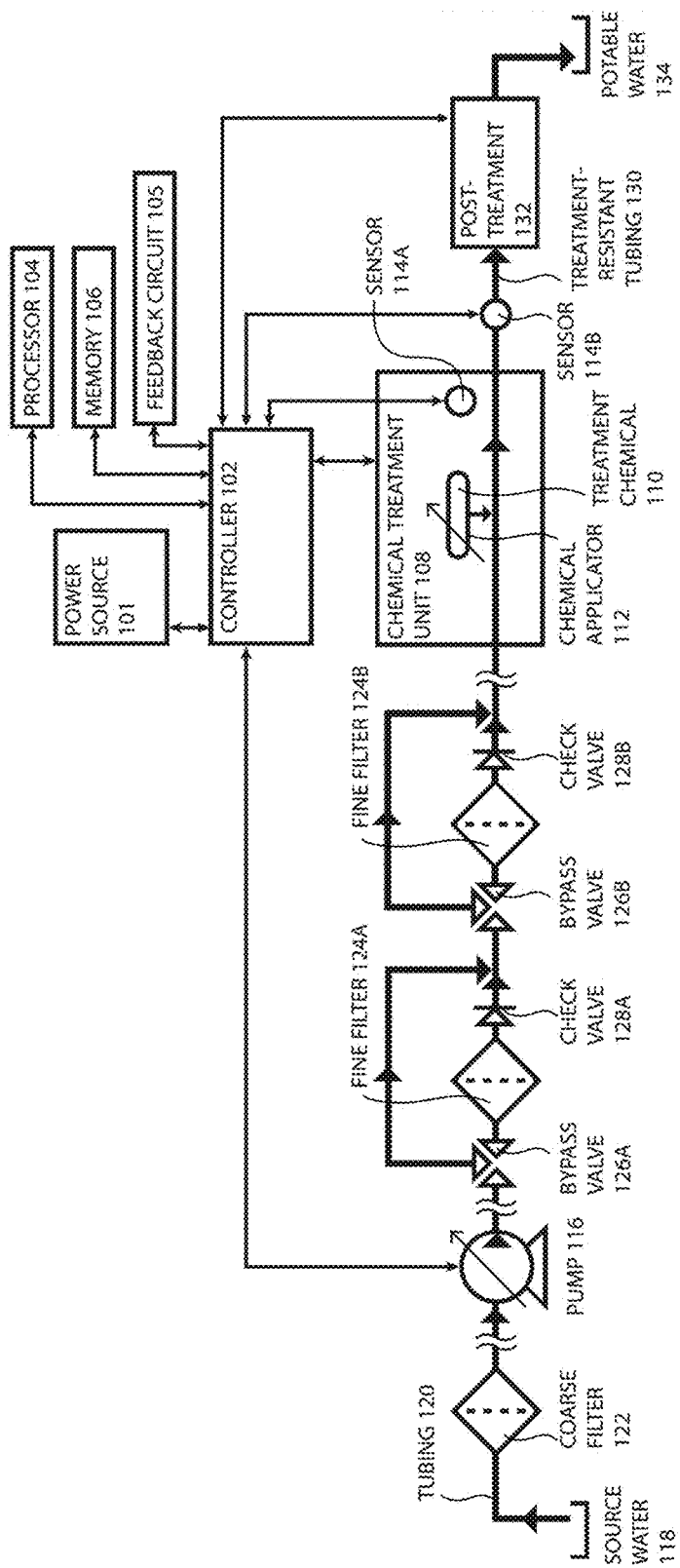
FIG. 1 is a portable water treatment unit illustrating water drawn by a pump at a first flow rate through a series of fine filters each having a bypass valve, the water to arrive at a chemical treatment unit where a treatment chemical is applied to produce potable water, one or more sensors measuring an effectiveness indicator of the chemical treatment and a controller changing a power supplied to the pump to change the first flow rate to a second flow rate, automatically adjusting a concentration of the treatment chemical to an effective level and/or reducing power usage of the portable water treatment unit, according to one or more embodiments.

FIG. 1 illustrates a schematic of a portable water treatment unit 100 that in one or more embodiments can be used to provide efficient and lightweight, man-portable water treatment solutions for many terrains, water types, and dynamic environments. Configured properly, the potable water produced by the portable water treatment unit 100 can be used for drinking or other uses such as sanitation of surfaces or vessels, and as a medical antiseptic (e.g., for disinfecting wounds). Moreover, in one or more embodiments the illustration of FIG. 1 is a flexible system and/or device that is able to adapt to multiple filters and source waters while automatically adjusting a flow rate of water moving through the portable chemical treatment unit to ensure the water is effectively treated. Instantiations of the portable water treatment unit 100, include instantiations utilizing ozone gas as the chemical treatment (which may be generated by several methods) are shown in FIG. 2, FIG. 3, FIG. 10, FIG. 11 and throughout this detailed description.

Specifically, FIG. 1 is a portable water treatment unit 100 illustrating water being drawn by a pump 116 at a first flow rate through a series of fine filters 124 each having a bypass valve 126, the water to arrive at a chemical treatment unit 108 where a treatment chemical 110 is applied to produce potable water 134, one or more sensors 114 measuring an effectiveness indicator of the chemical treatment 110 and a controller 102 changing a power supplied to the pump 116 to change the first flow rate to a second flow rate, automatically adjusting a concentration of the treatment chemical 110 to an effective level and/or reducing power usage of the portable water treatment unit 100, according to one or more embodiments.

FIG. 1 shows a controller 102 supplied by a power source 101 and communicatively coupled to a processor 104 and a memory 106. The controller 102 can initiate a chemical treatment unit 108 to treat water moving through the chemical treatment unit 108 by adding a treatment chemical 110 from a chemical applicator 112. One or more sensors 114 provide measurements and/or data of one or more effectiveness indicators that indicate, directly and/or indirectly, an effectiveness of the treatment chemical 110 in treating the water. For example, the one or more sensors 114 may directly sense a concentration of the treatment chemical 110 in the water, may indirectly sense an activity of the chemical applicator 112 and correlate that activity with a known effectiveness, or both. In response to and utilizing measurements and/or data gathered from the one or more sensors 114, the controller 102 changes power supplied to a pump 116 and/or a speed of the pump 116 that conveys a source water 118 to the chemical treatment unit 108. This processes of gathering data and/or signals of effectiveness indicators, processing the data and/or signals, and changing and/or modulating the power supplied to the pump 116 to adjust the flow rate is shown and described in conjunction with FIG. 2 through FIG. 6 and throughout this detailed description.

The water is originally drawn from the source water 118 by the pump 116 and passes into a tubing 120. The water then passed through one or more coarse filters 122 and one or more fine filters 124 (in the embodiment of FIG. 1, a fine filter 124A and a fine filter 124B). In FIG. 1, water flows from left to right according to the relatively thick arrowed line that begins at the source water 118 and terminates at the potable water 134. In contrast, electronic and/or electrical communication connections in the embodiment of FIG. 1 are represented according to the relatively thin double-arrowed lines. The source water 118 may be directed around each of the fine filters 124 utilizing a bypass valve 126 and optionally a check valve 128, as shown and described in conjunction with the embodiments of FIG. 7 and FIG. 8. The controller 102 may automatically adjust the pump 116 when a change in filter configuration and/or water composition alters the amount of the treatment chemical 106 required to effectively treat the water. The treated water may be passed through the treatment-resistant tubing 130, optionally undergoing the post-treatment 132 as described below, and is passed out of the portable water treatment unit 100 as the potable water 134.

A description of the use, materials and components of the portable water treatment unit 100 will now be given. To begin treatment using the portable water treatment unit 100, the tubing 120 is placed into the source water 118. The source water 118 can be of almost any composition where the portable water treatment unit 100 is configured with a correct type of filtration and the treatment chemical 110 is in sufficient concentration, especially where a strong oxidizer such as ozone is utilized. When properly configured, the portable water treatment unit 100 can treat water with a high degree of toxins and biological contaminants. Such water may include water contaminated with heavy metals, minerals such as arsenic, pollutants like benzene and other hydrocarbons, human and animal waste, bacteria, viruses, amoeba, toxins such as those produced by algal blooms, molds, and/or other pathogenic microbes. The tubing 120 may be any tubing sufficient to move water at a sufficient rate, for example from 0.25 of a liter to twenty liters of water per minute. The tubing 120 is preferably flexible. The tubing may also be a red color to indicate "unsafe," as may be a common standard in drinking water systems. For example, the tubing might be ⅜" inch diameter Polyurethane tubing. The tubing 120 connects several of the components of the portable water treatment unit 100 such that they are in fluid communication. Each of the components interacting with the water, including the fine filters 124, the chemical treatment unit 106, and/or the pump 116 may be placed at interstitial locations along the tubing 120 and/or the treatment-resistant tubing 130. In the initial stage of drawing the source water 118, the controller 102 may include a priming mode that supplies a relatively large power to the pump 116 and/or causes the pump 116 to operate at a high speed. This priming mode may continue until a user manually shuts off the priming mode and/or once water is detected moving through the pump 116 (e.g., by an resistance change in a shunt resistor of the pump that occurs when water is moving through the pump rather than air) and/or water is detected in the chemical treatment unit 108 (e.g., by the flowmeter 306 of FIG. 3).

Before reaching the chemical treatment unit 108 and accepting the treatment chemical 110, the water may be screened and/or filtered. The source water 118 may first pass through one or more instances of the coarse filter 122. The coarse filter may be, for example, one or more screens (e.g., 30-mesh, 80-mesh, 100-mesh and/or 240-by-50 mesh screens) that prevent relatively large particles from entering and potentially clogging the one or more fine filters 124. and/or dampening the effect of the treatment chemical 110, for example by acting as an oxidation target (e.g., reducing reagent) that reduces the ability of the treatment chemical 110 is an oxidizing reagent to attack harmful contaminates.

The pump 116 may then draw the screened source water 118 through one or more fine filters 124. Specifically, the embodiment of FIG. 1 includes two instances of the fine filter 124, the fine filter 124A and the fine filter 124B. The fine filter 124A, for example, may be a 5 micron sediment filter and the fine filter 124B may be a 5-micron activated carbon silver enhanced filter that includes silver particles known to attack a variety of bacteria and other microbes. In such a configuration, the fine filter 124A may remove particles and microbes and prolong the life of the fine filter One or more of the filters may also be multi-stage filters that include several discrete layers. Additional filters may be used that specifically target certain microbes, toxins, and/or other contaminates. For example, the fine filter 124 may remove lead and/or cadmium using heavy-metal chelates. The fine filters 124 may also utilize thin-membrane technologies such as graphene. The portable water treatment unit 100 may include any practicable number of fine filters 124 (e.g., a fine filters 124A through 124N). Additional instances of the fine filter 124 and useful configurations will be shown and described in conjunction with FIG. 7 and FIG. 8.

Each of the fine filters 124 may include a bypass valve 126 that can direct water around and bypass the particular fine filter 124. As explained in conjunction with FIG. 7 and FIG. 8, the bypass valve 126 may be useful for bypassing an empty contact where the fine filter 124 is removed, or bypass a filter that is damaged, depleted, and/or clogged. In addition, the bypass valve may direct water to bypass instances of the fine filters 124 that are inapplicable to a given instance of the source water 118. For example, an instance of the fine filter 124 removing benzene may not be needed when purifying water outside locations of known hydrocarbon contamination. Because the controller 102 may adjust power supplied to the pump 116 (e.g., adjust the speed of the pump) based upon one or more effectiveness indicators, the effectiveness indicators may be impacted by the combination of filters and/or source water 118. Therefore, as shown and described in conjunction with FIG. 5 and FIG. 6, the controller 102 may be able to automatically and dynamically compensate for any configuration of fine filters 124 and/or any combination of activated bypass valves 126. Following an instance of the fine filters 124 having a bypass, a check valve 128 may optionally be added to prevent reverse pressure against an outlet of the fine filter 124.

The pump 116 may be placed almost anywhere along the tubing 120 or treatment-resistant tubing 130, including upstream or downstream any of the fine filters 124. Although shown in an interstitial section of the tubing 120 between the fine filter 124B and the chemical treatment unit 108, the pump 116 may be placed between the coarse filter 122 and the fine filter 124A, between the fine filter 124A and the fine filter 124B, or even between the chemical treatment unit 108 and the post-treatment 132. However, in one or more preferred embodiments, the pump 116 may remain upstream of the chemical treatment unit 108 which may reduce exposure of the pump 116 to the treatment chemical 110 as the treatment chemical 110 may damage the pump 116 (e.g., where a strong oxidizer such as ozone is utilized as the treatment chemical 110 that may attack and/or weaken components of the pump 116).

Figure 2:
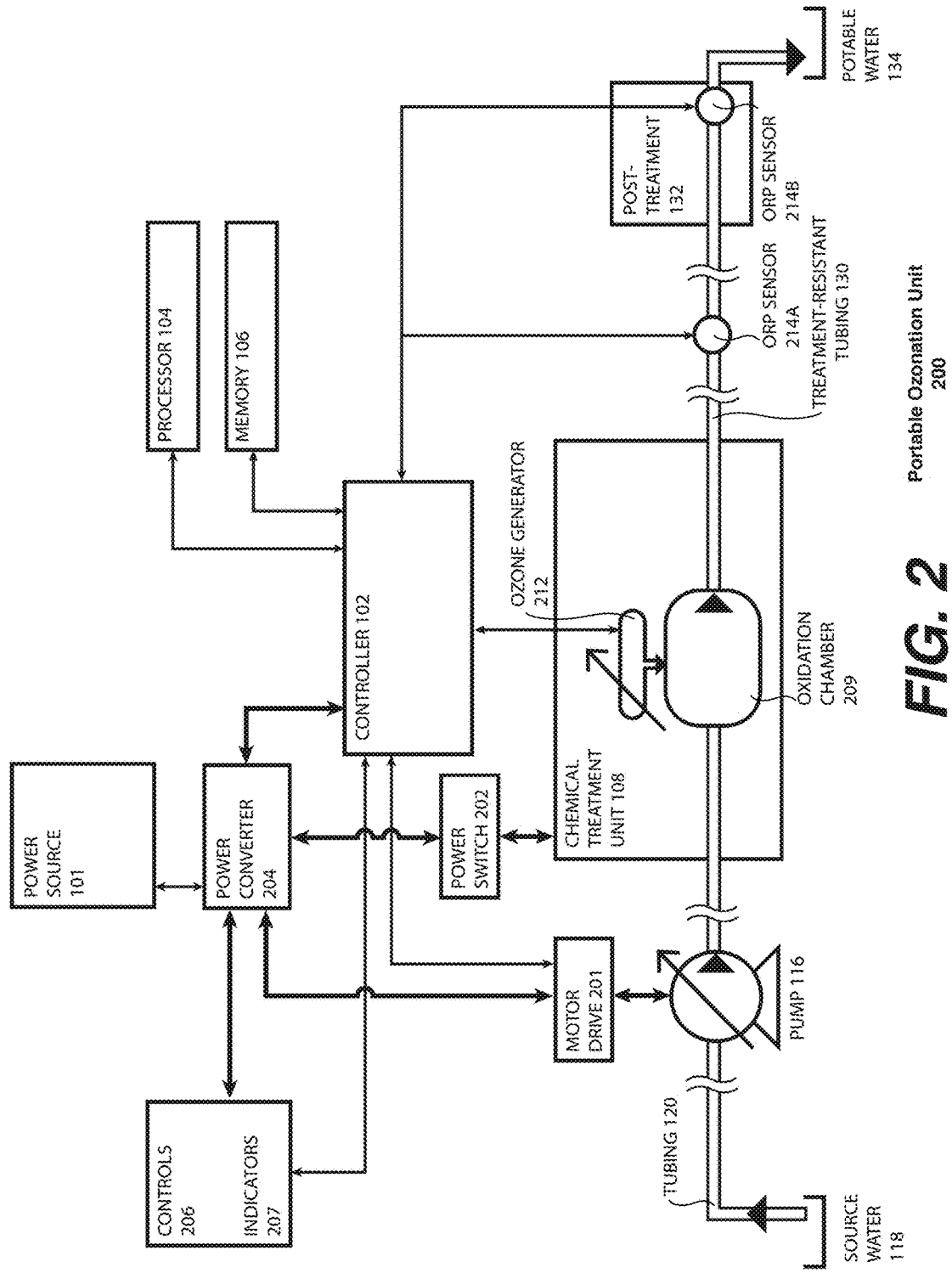
FIG. 2 is a portable ozonation unit illustrating an instance of the portable water treatment unit of FIG. 1 utilizing dissolved ozone produced by an ozone generator as the treatment chemical, an oxidation-reduction potential (ORP) measured by an ORP sensor and used as the effectiveness indicator, the power supplied to the pump changed to automatically increase the concentration of the dissolved ozone and/or reduce power usage of the portable ozonation unit, according to one or more embodiments.
Figure 9:
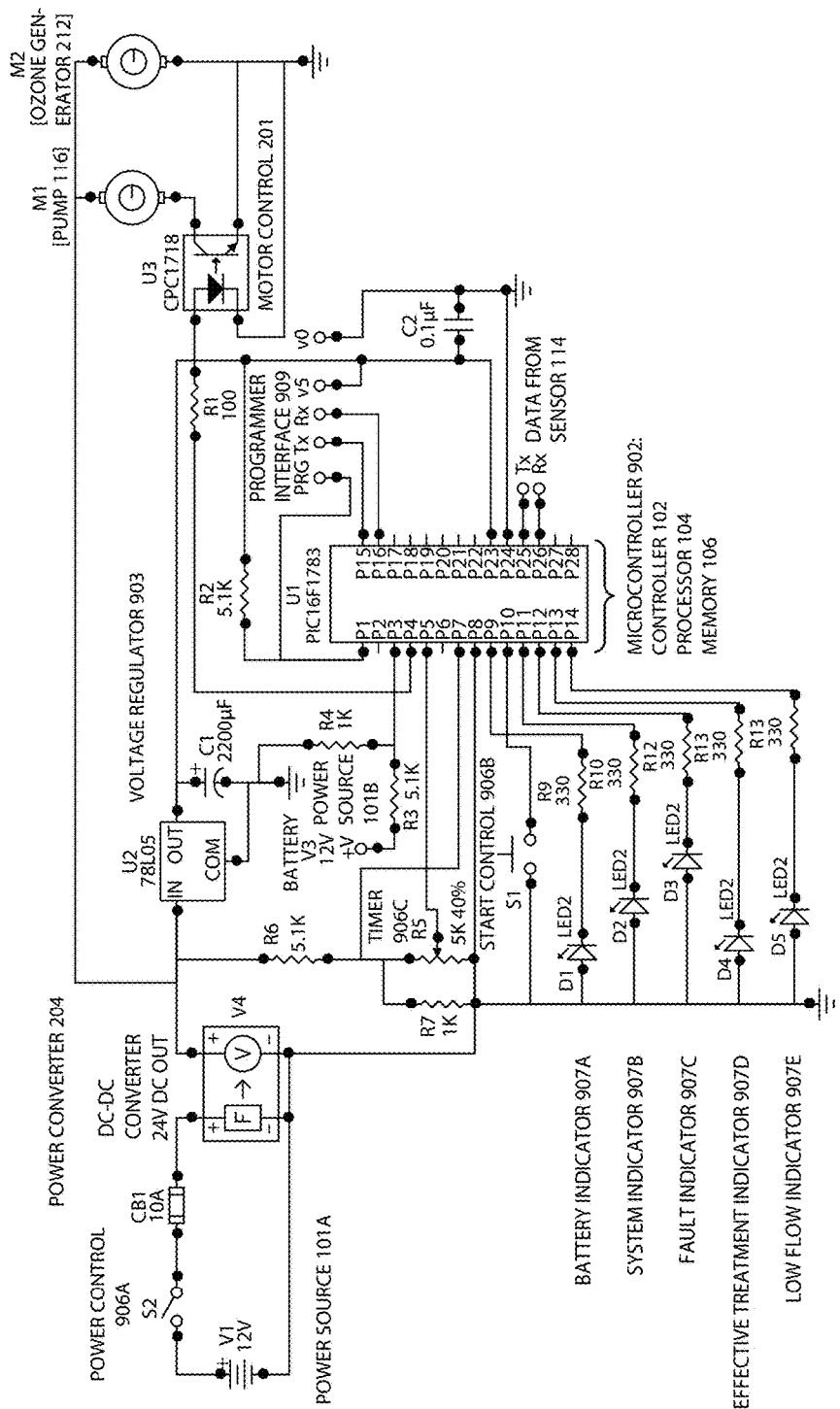
FIG. 9 is an example of an ozonation control circuit that can be utilized in the portable ozonation unit (and/or any of the implementation of FIG. 2, FIG. 3, FIG. 10 and/or FIG. 11) for processing an effectiveness indicator from a sensor of the ozone generator and changing power supplied to the pump to automatically adjust the concentration of treatment chemical and/or reduce power usage of the portable ozonation unit, according to one or more embodiments.

The pump 116 is of sufficient strength to pull water from the source water 118 and through both the one or more fine filters 124 and the chemical treatment unit 108. In addition, the pump is capable of operating at several effective speeds: the pump 116 may be a variable-speed pump or may be a fixed-speed pump controlled with pulse width modulation by the controller 102 (and/or the motor drive 201 as shown in FIG. 2 and FIG. 9). For example, the pump may be a 24-volt fixed speed pump capable of pumping at a range of flow rates depending on pulse width modulation frequency and strength. For example, the pump 116 may be chosen such that it can sustain a flow rate of between 0.25 and 10 liters per minute through an unobstructed ⅜ inch diameter tubing ten feet long having three 5 to 10 micron fine filters 124 that have previously experienced moderate use. Although not shown in FIG. 1, multiple pumps 116 may also be used in the portable water treatment unit regulated by the controller 102.

The source water 118, after any filtration from one or more filters, moves through the pump 116 and into the chemical treatment unit 108. The treatment chemical 110 is introduced to the water by the chemical applicator 112 as it flows through the chemical treatment unit 108. The treatment chemical 110 may include oxidation agents or reduction agents. For example, the treatment chemical 110 may be a hypochlorite, chloramine, a perchlorate, an iodate, hydrogen peroxide and/or chlorine. Other treatment chemicals 110 may be specially targeted to a particular type of organism, and/or a general-purpose antiseptic. However, in one or more preferred embodiments, the chemical treatment is ozone gas produced by an ozone generator (e.g., the ozone generator 212 of FIG. 2 as the chemical applicator 112) such that the ozone gas dissolves in the water flowing through the chemical treatment unit 108.

Ozone gas may be a preferred treatment chemical 110 for several reasons. First, it can be produced as needed by the portable water treatment unit 100, requiring only electricity from commonly available sources such as a wall socket or motor vehicle battery. From the perspective of safe water treatment, ozone is a strong oxidizer that gives rise to a high oxidation-reduction potential in treated water that, at the correct concentration, has been shown to be effective at neutralizing many toxins, bacteria and viruses. At the same time, ozone has a relatively short half-life in most water such that, if desired, the ozone can be allowed to decompose before consumption. Water with dissolved ozone can also be used soon after water treatment to disinfect foods, surfaces, implements and used as a general antiseptic, such as for wounds. Ozonized water may also lack potentially harmful byproducts of other treatments (e.g., chlorocarbons that may form as a result of chlorine-based treatments), and may leave the taste of treated water relatively unaffected. Accordingly, FIG. 2, FIG. 3, FIG. 10 and FIG. 11 show embodiments utilizing ozone as the treatment chemical 110.

The chemical treatment unit 108 is a unit and/or module grouping one or more components required to deliver, apply, add and/or administer the treatment chemical 110 to the water. The chemical treatment unit 108 may include a reservoir of the chemical treatment 100 and the chemical applicator 112 that meters out or otherwise adds the treatment chemical 110. The chemical treatment unit 108 may also include various sensors 114 and/or electronics for sensing effectiveness of the water treatment including operational sensors 114 for communicating an operational metric of the chemical treatment unit 108 as the effectiveness indicator. The treatment chemical 110 may be stored in a reservoir, a canister, and/or a vessel that is coupled to the chemical applicator 112. In some cases the chemical treatment unit 108 can directly produce the treatment chemical 110. For example, the ozone generator 212 of FIG. 2 produces ozone, e.g., via a corona discharge unit (e.g., the corona discharge unit 1008 of FIG. 10) and/or an electrolytic cell (e.g., the electrolytic cell 312 of FIG. 3). The chemical applicator may add the treatment chemical 110 at a fixed rate (e.g., one milligram per minute) or at a variable rate as determined by the controller 102. In one preferred embodiment, however, the speed of the pump 116 is the primary modulator of the concentration of the treatment chemical 110 that is added to the water and/or the effectiveness of the treatment chemical 100.

The chemical treatment unit 108 may include one or more instances of the sensor 114 to measure, sense and/or provide data related to the effectiveness indicators to the controller 102. For example, the sensor 114A may provide data and/or measurements that can be used to calculate and/or determine an effectiveness of the treatment chemical 106. Specifically, the sensor 114A shown in FIG. 1 may measure a voltage and/or current of the chemical treatment unit 108, chemical applicator 112, or both, to determine a rate at which the chemical applicator 112 is adding the treatment chemical 110 to the water and/or the concentration of the treatment chemical 110 based upon known metrics and/or calibration data (e.g., the calibration curves shown in FIG. 4). The sensor 114A may measure as the effectiveness indicator aspects known to be directly evident of effectiveness such as the concentration of the treatment chemical 110, the oxidation-reduction potential (ORP) (e.g., ORP sensor 214A of FIG. 2), and/or the pH of the treated water. When directly sensing concentration, ORP, and/or pH, the sensor 114 may be downstream of the chemical treatment unit 108, such as shown by the placement the sensor 114B in FIG. 1.

Other examples of acceptable sensors 114 are those that measure an off-gassing of the chemical treatment 110 or utilize a wavelength of ultraviolet, visible or infrared light to estimate concentration of the treatment chemical 110. For example, ozone concentration may be detected with ultraviolet absorbance at 254 nanometers and visible absorbance at 580 nanometers. The effectiveness indicator may also be an operational status of the chemical treatment unit 108 where the chemical treatment unit 108 includes circuits and/or microcontrollers to signal it is operating outside an effective range. For example the chemical treatment unit 108 may communicate that it is not effectively producing treated water due to a flow rate that is too high or too low. The chemical treatment unit 108 may include other sensors that may be unrelated to effectiveness indicators of the treatment chemical 110 but which still may be of importance in properly operating the portable water treatment unit 100 and/or components of the chemical treatment unit 108. Each of the sensors 114 are communicatively coupled to the controller 102.

The effectiveness value may be a value communicated by an instance of the sensor 114 related to any of the effectiveness indicators as interpreted by the controller 102. For example, an effectiveness value may include a measurement of oxidation-reduction potential in millivolts, a concentration in grams per liters or parts per million. The effectiveness value may also be or a signal communicated over a protocol from the chemical treatment unit 108 related to an operational metric of the chemical treatment unit 108, for example an operational value associated with a low concentration of the treatment chemical 110 in the water. The controller 102 may periodically receive data related to the effectiveness indicators from the one or more sensors 114. In one embodiment, the sensors 114 may include additional hardware and/or software to send data at certain threshold values. The sensors 110 may also routinely push data to the controller 102 and/or the controller 102 may periodically polls the one or more sensors 114.

The controller 102 is a set of circuits (which may include integrated circuits such as a microcontroller, as shown in FIG. 9), programmable logic and/or additional elements for accepting the data of the sensors 110 and determining how to change the power to the pump 116 and/or other components of the portable water treatment unit 100. In one or more embodiments, a feedback circuit 105 may be utilized to change the power to the pump 116. In one or more preferred embodiments, the controller 102 includes a processor 104 and a memory 106 that may include machine-readable instructions and/or calibration data for determining what changes to the power supplied to the pump 116 should be effected under given conditions to adjust the flow rate of the water. The use of the controller 102, the processor 104, and the memory 106 are described in detail in conjunction with FIG. 2 through FIG. 6, with a specific example embodiment shown in FIG. 9.

The power source 101 may be an alternating current from a wall socket, generator and/or a direct current supplied from a source such as a battery or a solar array. The battery may be a sealed lead acid, lithium ion, or lithium iron phosphate. The battery, for example, might be 10 volts, 12 volts or 24 volts. The power source 101 shown in FIG. 1 may additionally include a power converter to apply appropriate voltage and current to the controller 102 (that may also modulate power to one or more components, for example to the feedback circuit 105, the processor 104 and/or the memory 106) the chemical treatment unit 108, the one or more sensors 114, the pump 116, the motor drive 201 of FIG. 2, power switch 202, controls 206, the indicators 207, the ozone generator 212 and/or any other electronic or electrical components. The controller 102 may additionally determine a current voltage of the power source 101 and, when the current voltage is below a threshold value as stored in the memory 106, disable and/or cut power to the pump 116. For example, this may prevent inadequate water treatment known to occur when the power source 101 is depleted.

The treated water exits the chemical treatment unit 108 in the treatment-resistant tubing 130. The treatment-resistant tubing 130 may be tailored for the particular type of the treatment chemical 110 utilized in a given embodiment of the portable water treatment unit 100. For example, where the treatment chemical 110 is ozone, the tubing may be polytetrafluoroethylene (PTFE), Flexelene®, or fluorinated ethylene propylene (FEP), or polyurethane.

The treated water may be optionally conveyed to the post-treatment 132. The post-treatment 132 may include, for example, allowing the treatment chemical 110 to have a prolonged exposure to the water (e.g., in a contact bag), allowing the treatment chemical 110 to evaporate (e.g., by heating the water or increasing its surface area), providing low-level sustained secondary treatment (e.g., UV treatment) and/or applying a neutralizing agent (e.g., ascorbic acid and/or a decomposition catalyst) to eliminate or neutralize treatment chemical 110 remaining in the water. After leaving the optional post-treatment 132, the portable water treatment unit 100 has converted the source water 118 to the potable water 134 that is suitable for consumption. However, the portable water treatment unit 100 may still remain effective, and may remain lighter and more portable, when no instance of the post-treatment 132 is used. In one or more preferred embodiments, no post-treatment 132 is utilized unless applied in a separate system after the potable water 134 is collected from an output of the portable water treatment unit 100.

In addition to producing drinking water, the portable water treatment unit 100 may also be used to provide water for other forms of consumption. For example, the potable water 134 may be used for rendering medical aid. Additionally, in one or more embodiments the portable water treatment unit 100 may be used to produce disinfecting and/or antiseptic water that may have higher concentrations of the treatment chemical than are added to produce safe drinking water. Although not shown, the portable water treatment unit 100 may utilize additional modules to desalinate, remove minerals from and/or reduce water hardness of the source water 118.

FIG. 2 is a portable ozonation unit 200 illustrating an instance of the portable water treatment unit 100 of FIG. 1 utilizing dissolved ozone produced by an ozone generator 212 as the treatment chemical 110, an oxidation-reduction potential (ORP) measured by an ORP sensor 214A and used as the effectiveness indicator, the power supplied to the pump 116 changed to automatically increase the concentration of the dissolved ozone and/or reduce power usage of the portable ozonation unit 200, according to one or more embodiments. Specifically, FIG. 2 provides a detailed view of a system and/or apparatus that controls the power to the pump 116 and/or the flow rate of the water. FIG. 2 omits several components for clarity, for example the filters of FIG. 1. Accordingly, FIG. 2 further illustrates a motor drive 201 providing and/or modulating power to the pump 116, a power switch 202 directly controlling power to the chemical treatment unit 108 and a power converter 204 for adapting a voltage and/or a current of the power source 101. Further, FIG. 2 illustrates a set of controls 206 and indicators 207 providing an interface between a user and the portable ozonation unit 200. The chemical treatment unit 108 includes an ozone generator 212 as an instance of the chemical applicator 112, the ozone generator 212 adding ozone to an oxidation chamber 209 to mix with and/or dissolve in the water passing through the chemical treatment unit 108. Finally, the embodiment of FIG. 2 illustrates an instance of the sensor 114 that are an oxidation-reduction potential (ORP) sensor 214 to measure a reduction potential of the treated water. FIG. 2 shows two such sensors, the ORP sensor 214A and the ORP sensor 214B.

A user activates the portable ozonation unit 200 by utilizing the controls 206 which initiate power to the controller 102. The power source 101 may be converted by the power converter 204 to provide appropriate voltage and/or current to the controller 102 and other electronic components. After a timer is set, One or more indicators 207 may alert the user that the portable ozonation unit 200 is on, priming, functioning properly, not functioning properly (in which case the pump is instructed to stop running) and effectively treating water based on the sensed effectiveness indicators. Specific examples of the indicators are shown and described in conjunction with FIG. 9. Additional controls 206 may then prime the pump 116 by directing enough power and/or engaging the pump 116 at such at speed as to draw the source water 118 through the tubing 120. The controller 102 may then automatically initiate the chemical treatment unit 108. The chemical treatment unit 108 supplies power to the ozone generator 212, which may add the treatment chemical 110 at one of several variable rates or a fixed rate. The controller 102 may modulate power going to the ozone generator 212 to regulate a rate of production of the ozone. However, in one preferred embodiment, a power is supplied to the ozone generator 212 such that it produces a constant amount of ozone per unit of time at a sufficient rate to treat relatively clean water at one liter per minute of flow rate (e.g., to provide 0.2 to 0.6 parts per million dissolved ozone). The controller 102 may utilize settings and/or machine readable instructions installed in the memory 106 to provide appropriate power to the motor drive 201, the chemical treatment unit 108, the ozone generator 212 and/or any additional electrical or electronic components.

The ozone generator 212 may use any means of generating ozone from the power source. For example the ozone generator 212 may be a corona discharge ozone generator that utilizes ambient oxygen in the atmosphere to create ozone from diatomic oxygen atoms, then injecting the resulting ozone gas directly into the water flowing through the chemical treatment unit 108. For example, a venturi may be used to draw oxygen into the flowing water, and/or an atmosphere assist (e.g., the atmosphere assist 1003 of FIG. 10) may be used to force air at an increased pressure through a dispersal mechanism submerged in the water. The ozone generator 212 may also use an arc or other electrical means of exciting diatomic oxygen molecules such that they enter the strained, high-energy configuration of ozone. Additionally, in one preferred embodiment as shown and described in FIG. 3, an electrolytic cell 312 is used to produce ozone directly from water molecules flowing through the electrolytic cell.

As treated water passes one or more of the sensors 114 (specifically in FIG. 2 the ORP sensor 214A and the ORP sensor 214B) a signal and/or data related to an effectiveness indicator (of the oxidation-reduction potential of the water in FIG. 2) is communicated to the controller 102. The sensors may use common microcontroller serial communication protocols such as Inter-Integrated Circuit Protocol (I2C) or Serial Peripheral Interface (SPI). For example, to effect the communication the ORP sensor 214A and/or ORP sensor 214B may be periodically polled, convey signals and/or data when predetermined threshold values, changes in values, or acceleration of values are sensed, and/or provide a stream of data to be sorted and processed by the controller 102. The controller 102 accepts these values and may compare them to reference values in the memory 106 utilizing the processor 104 as shown and described in conjunction with process flow 550 of FIG. 5 and process flow 650 of FIG. 6. The controller 102 may also process data of one or more sensors to convey signals to one or more of the indicators 207, for example that a flow rate of the water is too low or that a concentration of the treatment chemical 110 is too high.

The ORP sensor 214A may be located outside the ozone treatment unit 108, which may be useful because the chemical treatment 110 may become more uniformly distributed within the water after a certain distance (e.g., six inches, two feet) downstream of the chemical treatment unit 108. Similarly, the ORP sensor 214B is shown in the post-treatment 132, for example to sense an ambient oxidation-reduction potential in a reservoir of the potable water 134 and/or a contact bag that allows sustained exposure of the ozone to contaminants in the water. Although the ORP sensor 214A is shown between the chemical treatment unit 108 and the post-treatment 132 and the ORP sensor 214B is shown within the post-treatment 214B, an additional instance of the ORP sensor 214 may be installed in other locations downstream of the chemical treatment unit 108. One or more ORP sensors 214 may also be at the location of the ozone generator 212 (e.g., within a fraction of an inch or a few inches of a location where the ozone gas is created such as an anode of the electrolytic cell) or within the oxidation chamber 209. Although FIG. 2 shows both the sensor 214A and 214B, a single sensor may be utilized.

As shown in the embodiment of FIG. 1, a feedback circuit 105 may be used in addition to or as an alternative to the processor 104 and the memory 106. Similarly, in the embodiment of FIG. 2, the feedback circuit 105 may be utilized. The feedback circuit 105 accepts one or more voltage inputs and/or signals from the controller 102 and/or one or more of the sensors 110. The feedback circuit 105 then converts the voltage inputs and/or signals into an appropriate power to be supplied to the pump 116. For example, the feedback circuit 105 may translate a series of voltages and currents generated by an oxidation-reduction potential sensor (e.g., the ORP sensor 214A) into different voltages and currents to be supplied to the pump 116. The feedback circuit 105 may also be a negative feedback loop that receives a signal associated with an effectiveness indicator and translates the signal into another signal that causes the pump 116 to either speed up or slow the flow rate of the water moving to the chemical treatment unit 108. Thus, the negative feedback loop may increase accuracy of concentration of the treatment chemical 110 in the water by stabilizing the flow rate. The sensor 114 may send continuous or periodic signals to the feedback circuit 105 to allow for continuous or periodic change in power supplied to the pump 116. The feedback circuit 105 and/or the controller 102 may also be implemented as an application-specific integrated circuit (ASIC) chip.

Figure 3:
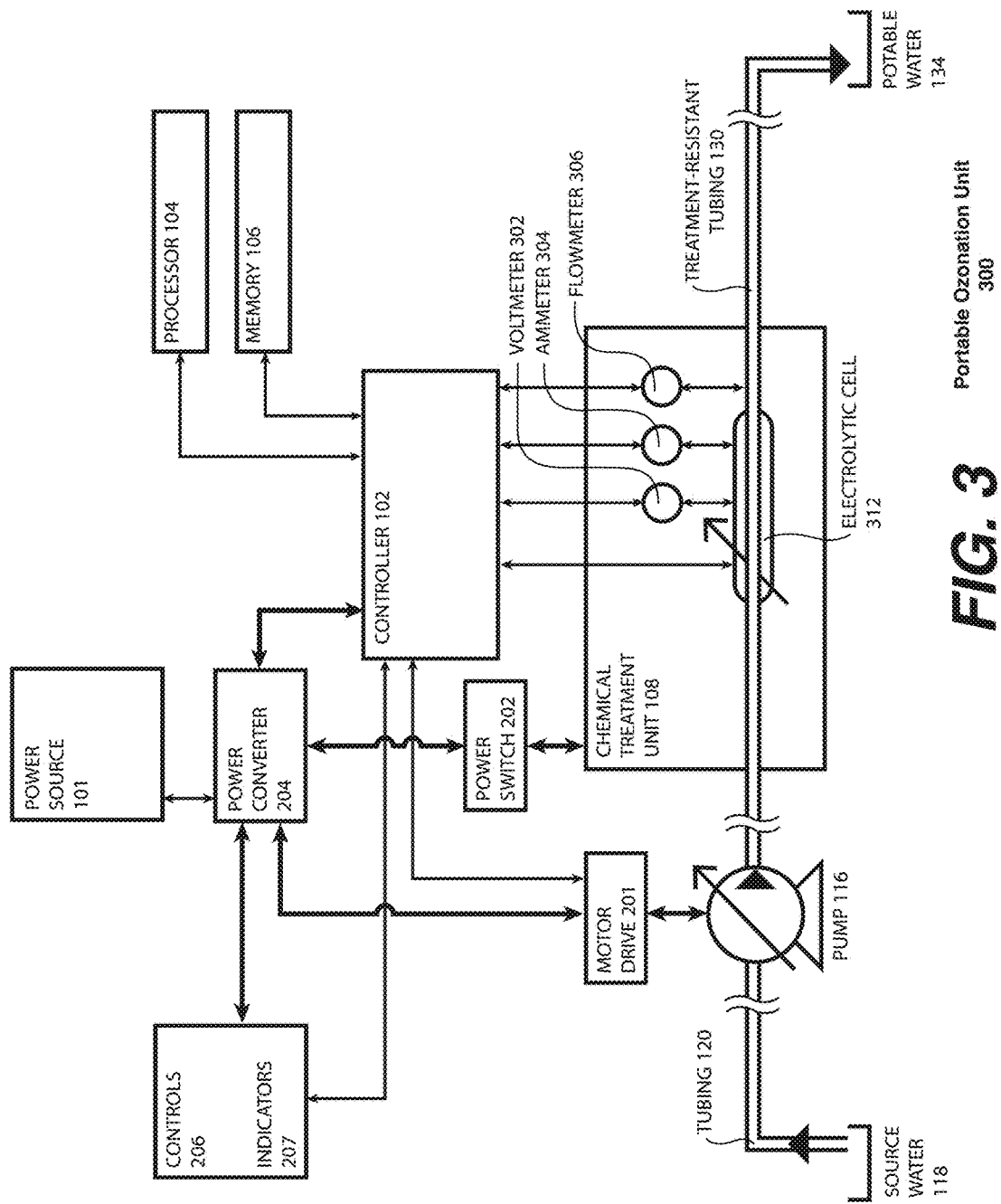
FIG. 3 is another instance of the portable ozonation unit, dissolved ozone produced by an electrolytic cell, the effectiveness indicator an operational metric of the ozone generator and/or an activity of the electrolytic cell as measured by a voltmeter and/or ammeter, the power supplied to the pump changed to automatically adjust the concentration of the dissolved ozone and/or reduce power usage of the portable ozonation unit, according to one or more embodiments.

FIG. 3 a portable ozonation unit 300, dissolved ozone produced by an electrolytic cell 312, the effectiveness indicator an operational metric of the ozone generator 212 and/or an activity of the electrolytic cell 312 as measured by a voltmeter 302 and/or ammeter 304, the power supplied to the pump 116 changed to automatically adjust the concentration of the dissolved ozone and/or reduce power usage of the portable ozonation unit 100, according to one or more embodiments. FIG. 3 shows a specific preferred embodiment in which the ozone generator 212 of FIG. 2 is specifically implemented as the electrolytic cell 312. For example, the electrolytic cell may be a boron-doped diamond cell with periodic reversing polarity that generates ozone at both a cathode and anode of the cell, as described in conjunction with the specific embodiment of FIG. 11. The electrolytic cell 312 may have a higher efficiency of generating ozone, and as shown in FIG. 4 may be able to achieve rates of dissolved ozone at least as high as 0.6 ppm dissolved ozone at 1 liter per minute flow rate.

Upon initialization of the chemical treatment unit 108, the controller 102 may apply a consistent voltage and/or current to the electrolytic cell such that it produces a constant ozone output. The effectiveness indicator may be a direct effectiveness indicator such as an oxidation-reduction potential, as in FIG. 2, or may be one or more indirect indicators provided by communication from sensors of the chemical treatment unit 108 and/or the electrolytic cell 312. Where direct effectiveness indicators are used, including an ozone concentration probe, the memory 106 may include a data related to a calibration curve and/or reference values of known effectiveness ranges based on the effectiveness indicators. As shown and described in conjunction with FIG. 4, FIG. 5 and FIG. 6, ozone generators may follow idiosyncratic profiles for water flow rate in relation to dissolved ozone concentration, and may in some cases require such a specialized calibration curve to properly interpret the sensor 114 data and, set the correct flow rate of the pump 116 and/or move toward an equilibrium point of effective treatment. In the embodiment of FIG. 3, indirect effectiveness indicators are used. Specifically, the voltmeter 302 and the ammeter 304 may provide feedback as the effectiveness of the ozone treatment. For example, when a given current of the electrolytic cell is measured, the controller 102 may reference the memory 106 for data related to an expected ozone generation rate at the given current. For example, a conductivity of the source water 118 may affect the current and/or voltage drawn by the electrolytic cell 312 and therefore ozone production. Where voltage and/or current is increased to a maximum amount that can be handled by the ozone generator 212 and/or electrolytic cell 312, changing power supplied to the pump to change flow rate may be one of the only ways to ensure effective production of the potable water 134. In addition, commercial instances of the electrolytic cell may be utilized that generate one or more signals related to whether a flow rate exceeds a maximum flow for effective treatment or is under minimum flow for effective treatment. In such a case, data and/or signals generated by the cell may be utilized directly as an effectiveness indicator utilized and processed by the controller 102.

The electrolytic cell 312 (and/or any instance of the chemical applicator 112 and/or the ozone generator 212) may have a minimum flow rate at which it may damage or deplete itself or otherwise become dangerous or ineffective. Thus, the portable ozonation unit 300 may include the flowmeter 306. At certain flow rates, the controller 102 may utilize control data of the flowmeter 306 to shut off the chemical treatment unit 108, shut off the electrolytic cell 312, and/or prevent more power or less power from being supplied to the pump 116.

The controller 102 may utilize one or more predetermined values and/or datasets that allow the processing and interpretation of data of the one or more sensors 114. In one or more embodiments, the memory 106 may include threshold values to which a measured value of the effectiveness indicators from the one or more sensors 114 is compared. Where the effectiveness value is below an effective threshold value, the controller 102 may generally decrease power to the pump 116 and/or changes the speed of the pump 116 to slow the flow rate of the water to the chemical treatment unit 108. The calibration data of FIG. 4A and FIG. 4B is an example data that may be utilized to establish an appropriate response of the controller 102 to the effectiveness indicator.

Where a flowmeter (e.g., the flowmeter 306) measures a rate of the water flow and a known concentration is generally known to be effective, the controller may change the power supplied to the pump to achieve the effective rate. However, certain concentrations of contaminates and/or particulate may affect what concentration is considered adequate for effective treatment (e.g., the concentration may quickly decrease from reaction with particulate). The general calibration curve 450A, shown below, demonstrates a general relationship between flow rate and concentration. However, rather than determine the flow rate the portable water treatment unit may determine whether the flow rate should be increased or decreased. Therefore, one or more effectiveness indicators are utilized, for example: an oxidation-reduction potential, a concentration of the treatment chemical in the water, and/or current drawn by the electrolytic cell 312 such that a known amount of ozone is produced.

FIG. 4A is an example of a general calibration curve 450A that may be utilized in calibrating the controller 102 of the portable water treatment unit 100 to appropriately change the power supplied to the pump 116 in response to the effectiveness indicator that is a concentration measurement, according to one or more embodiments. FIG. 4A provides a graph where treatment chemical is added at a constant rate of 1 gram per minute to the water that is moving at varying flow rates, resulting in several chemical concentration rates plotted as values of the Y-axis. The treatment chemical concentration, in milligrams per liter (also referred to as parts per million of "ppms"), is represented on the Y-axis. Water flow rate in liters per minute is represented on the X-axis.

In one or more embodiments, the general calibration curve 450A of FIG. 4A can be utilized in conjunction with an additional calibration curves in which power supplied to the pump is varied and resulting flow rates are measured and recorded. For example, where the treatment chemical 110 (e.g., chloramine) is measured at 1.5 ppm at the known application rate, the flow rate is about 0.69 liters per minute. The controller 102 may reference the memory 104 to determine that this reference value is not effective for a given usage (e.g., specified by the user with the controls 206) and automatically decrease power to the pump 116 to decrease the flow rate, increasing the concentration as demonstrated by the general calibration curve 450A. The controller 120 may increase or decrease power to the pump 116 slowly, continually parsing data of the one or more sensors 114 as to arrive at equilibrium with an effective amount of the treatment chemical 110 without overshooting a stability point for a given filter usage and given water composition. Use of the controller 102, the processor 104 and the memory 106 in processing and automatically responding to the effectiveness indicators is shown and described in conjunction with FIG. 5 and FIG. 6.

However, in one or more embodiments, ranges of values for effectiveness indicators may need to be empirically determined when a relation between the effectiveness of the treatment chemical 110 and one or more effectiveness indicators are unpredictable due to a particular physical phenomenon. Specifically, certain instances of the chemical applicator 112 may, for certain value ranges, increase effectiveness of the chemical treatment 110 as flow rate increases (or have a less pronounced decrease in effectiveness of the chemical treatment 110 and/or concentration compared with the general calibration cure 450A). For example the electrolytic ozone 312 adds ozone to passing water by producing small bubbles at an anode and a cathode. However, where the flow rate of the water is too low, the bubbles may continue to grow, losing surface area as they gain in volume, detaching from the electrode and off-gassing before dissolving.

FIG. 4B is a calibration curve 450B that may be utilized in calibrating the controller of the portable ozonation unit 300 utilizing an electrolytic cell 312 to appropriately change the power supplied to the pump 116 in response to the effectiveness indicator that is a voltage and/or amperage of the electrolytic cell 312, according to one or more embodiments. Specifically, the calibration curve 450 is an ozone generation unit 208, utilizing an electrolytic cell 312, produced by Electrolytic Ozone Incorporated® ("EOI"). The calibration curve 450 includes four discrete curves for operation of the electrolytic cell 312 at currents of 1.30 amps, 1.00 amps, 0.75 amps, ad 0.50 amps. By measuring the flow rate of the water moving past the electrolytic cell 312 and an effectiveness indicator that is the current, references values of the calibration curve 450B may be stored in the memory 106 to determine the power to the pump 116 should be increased, decreased, or maintained.

The controller 102 utilizes data of the one or more sensors to determine an appropriate allocation of and/or change in power supplied to the pump 116. FIG. 5 is a water treatment process flow 550 illustrating a process in which the flow rate of the portable water treatment unit 100 is automatically adjusted to the produce potable water 134, according to one or more embodiments. Process 500 activates a pump 116 of a portable water treatment unit 100 at a first speed to initiate a flow of water (e.g., the source water 118) at a first flow rate from a source end of a tubing 120, through one or more filters (e.g., one or more coarse filters 122 and/or one or more fine filters 124) and through a chemical treatment unit 108 comprising a chemical applicator 112. Process 502 initiates the chemical treatment unit 108 to deliver a treatment chemical 110 from the chemical applicator 112 of the chemical treatment unit 108 to the water flow. For example, the chemical treatment unit 108 may begin to supply a fixed amount of the treatment chemical 110 (e.g., one gram per minute) or supply a fixed current to an ozone generator 212 to produce a constant amount of ozone).

Process 504 measures an effectiveness value of an effectiveness indicator of the chemical treatment 110 (e.g., a concentration of the treatment chemical 110, an operational metric of the chemical treatment unit 108, an oxidation-reduction potential of the water, a current and/or a voltage of an ozone generator 212) from a sensor 114 located at least at the chemical treatment unit 108 (e.g., within a few centimeters of a location where the treatment chemical is added to the water) and/or downstream of the chemical treatment unit 108. Process 506 compares the value of the effectiveness indicator to a reference value in a physical memory 106 and/or communicates the effectiveness value to a feedback circuit 105. For example, the controller 102 may compare the effectiveness value to a value stored in the memory 106 using the processor 104. Similarly, the effectiveness value may be communicated to the feedback circuit 105 where a voltage and/or another electronic aspect of the effectiveness indicator is altered by the feedback circuit 105. Process 508 determines that the effectiveness value is less than a threshold value for effective treatment through at least one of a computer processor 104 and the feedback circuit 105. In the case of the feedback circuit 105, the signal and/or communication may be directly altered by the feedback circuit 105 and communicated to the controller 102 and/or the pump 116. Process 510 automatically adjusts the first speed of the pump 116 to a second speed to change the first flow rate to a second flow rate, the second flow rate to adjust the concentration of the treatment chemical 110 to ensure effective treatment of the water and/or efficient usage of the chemical treatment 110. For example, where the value of the effectiveness indicator shows that the water treatment is not currently effective, the controller 102 will automatically decrease power to and/or the speed of the pump 116 to increase the concentration of the treatment chemical 110 in the potable water 134. Similarly, where the effectiveness indicator shows that the chemical treatment 110 is more concentrated than necessary (possibly indicating an inefficient usage of energy) the controller 102 may increase the speed of the pump 116 to increase flow rate.

FIG. 6 is a water treatment process flow 650 illustrating a process by which the effectiveness value may be compared against predetermined values (e.g., reference values) stored in a memory 106 of the controller 102 and/or designed into the feedback circuit 105 of the controller 102, according to one or more embodiments. Process 600 activates the pump 116 to initiate a first flow rate. Once water has reached the chemical treatment unit 108, process 602 activates the chemical applicator 112 to administer the treatment chemical 110. Process 604 measures one or more effectiveness indicators from one or more instances of the sensor 114 (e.g., the ORP sensor 214). Process 606 compares the effectiveness value measured in process 604 against a reference value within the memory 106 and/or automatically conveys the reference value to the feedback circuit 105. Process 608 determines whether the effectiveness value is higher than an efficient range (e.g., a range of value at which the portable water treatment unit is efficiently producing treated water). If higher than the efficient range, process 610 increases the speed of the pump 116 to initiate a faster flow rate. Where not higher than the efficient range, the water treatment process flow 650 advances to process 612.

Process 612 is a decision that determines whether the effectiveness value is less than the effective range within the memory 106. Where not less than the effective range, the current power and/or speed of the pump 116 is maintained for a predetermined period of time before returning to operation 604. On the other hand, where process 612 determines that the effectiveness value of the effectiveness indicator shows the treatment chemical 110 is not in sufficiently effective concentration, the portable water treatment unit 100 will decrease power to and/or speed of the pump 116 (e.g., according to process 618). However, where the portable water treatment unit includes a flowmeter (e.g., the flowmeter 306) process 616 determines whether the current flow rate is below the minimum flow rate stored in the memory 106. If not, process 618 decreases the speed of the pump 116 to initiate a slower flow rate, then returns to process 604. In contrast, where the flow rate is determined by process 616 to be less than the minimum flow rate, operation 620 terminates power to the pump 116, the chemical treatment unit 108 and/or additional electronics. Additionally, one or more indicators 207 may activate to signal a problem has been encountered with the water treatment process. The feedback circuit 105 may have processes 604 through 618 designed and such that a signal voltage is automatically increased, maintained, or decreased depending on initial voltages provided by one or more of the sensors 114.

As shown in FIG. 1, the portable water treatment unit 100 may utilize one or more filters prior to application of the treatment chemical 110. Designed for dynamic environments where the source water 118 may vary widely and replacement components could be difficult to find, the portable water treatment unit 100 may include easy to replace filters and bypasses for each filter socket to easily and quickly configure a combination of filters. In conjunction with the automatic adjustment of the pump 116 according to the sensed effectiveness indicators of both the composition of the source water 118 and flow resistance of the one or more filters, a user may be able to quickly adapt the portable water treatment unit 100 to almost any source water 118.

FIG. 7 is a filter and filter bypass view 750 illustrating a number of filters that may be used in the portable water treatment unit 100 along with bypass valves 126 that can easily combine various filters and/or bypass clogged or unnecessary filters to quickly adjust to various field conditions, the controller 102 of FIG. 1 automatically adjusting power to the pump 116 to account for changing flow resistance and/or composition of the source water 118 that may change based on filter usage, according to one or more embodiments. During this process the source water 118 may move through one or more stages of filtration.

In stage I, the source water 118 may move through a set of one or more coarse filters 122. The coarse filter 122 may be fitted to an end of the tubing 120 through which the source water 118 is initially drawn. The coarse filter 722A, for example, may be a 80-mesh strainer to prevent sediment from entering the tubing 120. A float, or a float/weight combination may also be attached such that the coarse filter 722A sits a set distance below the surface of the source water 118. Next, a coarse filter 122 may be employed to catch smaller sediment: the coarse filter 722B may be 50-by-240 ("50×240") mesh inline T-filter. After leaving the coarse filter 722B the source water 118 may include the sub 50×240-mesh particles 700. In one or more embodiments, the water may then pass through the pump 116. However, as described in conjunction with FIG. 1, the pump 116 may be located at any point along the tubing 120 including before or after the one or more of the fine filters 124.

Next, the water may reach the set of one or more fine filters 124. The fine filters of FIG. 7 represent two general stages, Stage 2 comprising the fine filter 724A and the fine filter 724B both implicated for general-purpose use as a Stage 2A and stage 2B, respectively, and Stage 3 in utilizing a specialized filter. In the embodiment of FIG. 7, the fine filter 724A is comprised of sediment filter with a 10 micron (μm) rating. The water is shown drawn through the fine filter 724A to produce water having the sub 10 micron particles 702.

The bypass valve 126B may be activated during ordinary use to bypass the Stage 3 filtration. Thus, the water having the 10 micron particles 702 may move around the fine filter 724B and the check valve 128B may prevent backflow into the fine filter 724B. Bypass valve 126C may remain inactivated, directing the water through the fine filter 724C. In the embodiment of FIG. 7 the fine filter 724C may be a 5 micron activated carbon and/or silver core filter, the silver core possibly providing an antimicrobial effect according to some research. The result may be the water having the sub 5 micron particles 704. The water is then pushed through the tubing 120 and eventually to the chemical treatment unit 108. However, where different field conditions are encountered by the user of the portable water treatment unit 100 the set of bypass valves 126 and fine filters 126 may be in a different configuration, as shown in FIG. 8.

FIG. 8 is a filter and filter bypass view 850 illustrating usage of the bypass valves 126 to adjust to a specific environmental challenge, adapt to a filter that has reached capacity, and/or to conserve a low energy source, according to one or more embodiments. Specifically, the embodiment of FIG. 8 illustrates a configuration of the portable water treatment unit 100 useable, for example, where the source water 118 is a source of relative purity and/or safety, where the fine filter 724C has reached its capacity, where the filter may fail due to a defect of a manufacturer of the filter, and/or where the power source 101 may have to be conserved such in a remote location or natural disaster. The bypass valve 126C may be activated such that the fine filter 724C is bypassed, the water moving to the chemical treatment unit 108 therefore containing the sub 10 micron particles 702.

When one or more of the fine filters 114 are bypassed, the treatment chemical 110 may still be able to effectively treat the water to produce the potable water 134, especially, for example, where ozone is utilized. To ensure the water remains effectively treated, one or more of the sensors 114 may continuously monitor effectiveness indicators, including any changes to the effectiveness of the treatment of the water as a result of a new filter configuration from an adjustment of one or more of the bypass valves 126. For example, as shown in FIG. 8, as the user switches bypass valve 126C to bypass the fine filter 724C, a resistance of the pump 116 in pushing water through the portable water treatment unit 100 may sharply decrease, increasing the flow rate of the water moving through the chemical treatment unit 108 while also increasing the particle size and/or potential contaminates in the water. As a result, one or more of the sensors 114 may read effectiveness indicators to determine that the chemical treatment is less effective (e.g., due to the higher flow rate and/or an increased particulate). Thus, the controller 102 may utilize the data of the one or more sensors 114 to reduce power to the pump 116 to slow the flow rate of the water until the one or more sensors 114 relay data determined by the controller 102 to be within an acceptable range for effective treatment. Additional configurations of the embodiment of FIG. 8 could be used, for example to create disinfecting water from an otherwise pure water source by bypassing all of the Stage 2 and Stage 3 filtration. Similarly, lead could be removed from an otherwise clean water source by bypassing the fine filter 724A and 724C. Finally, the water can be pushed through all of the fine filters 124 simultaneously when all of the bypass valves 126 are inactivated.

FIG. 9 is an example of an ozonation control circuit 900 that can be utilized in the portable ozonation unit 100 (and/or any of the implementation of FIG. 2, FIG. 3, FIG. 10 and/or FIG. 11) for processing an effectiveness indicator from a sensor 114 of the ozone generator 108 and changing power supplied to the pump 116 to automatically adjust the concentration of treatment chemical 110 and/or reduce power usage of the portable ozonation unit 100, according to one or more embodiments. The ozonation control circuit 900 may also be able to be adapted by one skilled in the art to utilize different instances of the treatment chemical 110 such as chloramine or iodate.

In the embodiment of FIG. 9, a first voltage source (V1) is the power source 201A, specifically a 12 volt battery. The 12 volt battery may be a motor vehicle battery, an internal lithium ion battery, a lithium iron phosphate battery, or a set of commodity 1.5 volt batteries in series and/or in parallel to result in an acceptable voltage, and/or a solar array. Main power is initiated to the control circuit 900 with a power control 906A that is, for example, a simple throw switch. A power converter 204 is a DC-to-DC converter that alters the battery voltage into 24 volts, providing a second voltage source (V2). Start control 906 be may be a push-button that when held initiates a priming mode of the pump 116 (M1) and when pressed initiates the pump 116 at a first speed along with initiating the ozone generator 212 (M2) to begin producing ozone. The ozonation continues for a length of time determined by the timer 906C which, for example, may provide from one to sixty minutes of power to the pump 116 and/or or the ozone generator 212. The motor control 201, which in the embodiment of FIG. 9 is a model CPC1718 controller, may provide and/or regulate power to the pump 116 to alter the speed of the water flow. The motor control 201, for example, may modulate the pump 116 using pulse width modulation. The voltage regulator 902 (U2) is a model 79L05 component.

The microcontroller 902 is an integrated circuit that includes and/or accomplishes the function of the controller 102, the processor 104, the memory 106 and/or additional electronic components. The microcontroller 902 may be used in any of the embodiments disclosed in this detailed description. In the embodiment of FIG. 9, the microcontroller is specifically a 28-pin model PIC16F1783 microcontroller from Microchip Technology Inc. (in the embodiment of FIG. 9 each pin of the microcontroller is denoted P1 through P28). Pin 1 (P1) through Pin 8 (P8) may be used to control the pump 116 and the ozone generator 112, including a control 206 for the timer 906B. Pin 9 (P9) through Pin 14 (P15) are used for the start control 906B and to illuminate several indicators 207 (e.g., the battery indicator 907A). Pin 17 (P17) receives signals and/or data from one or more instances of the sensor 114 and Pin 18 (P18) may optionally be used to communicate data and/or signals to the one or more instances of the sensor 114. Where more than one instance of the sensor 114 is used, additional pins may be used to receive or send communications to the additional sensors 114. Pin 8 (P8) and Pin 19 (P19) may be used for connection to a ground and/or a negative voltage. Pin 18 (P18) may be used to provide a positive supply voltage. Pin 1 (P1), Pin 27 (P27) and pin 28 (P28) may be utilized together to program and/or install machine-readable instructions in the memory 106 of the microcontroller 902 such as code implementing the process flows of FIG. 5 and FIG. 6. The power source 101B is a 12 volt battery (V3) that may be utilized to maintain the machine-readable instructions in the memory 106 of the microcontroller 902.

The circuit 900 also includes several indicators 207 that are light emitting diodes (LEDs) in the embodiment of FIG. 9. The battery indicator 907A may signal that one or more of the power sources 101 have dropped below a threshold value (e.g., the power source 101A dropping below 10.9 volts). The system indicator 907B may signal the portable water treatment unit 100 is in a powered state (e.g., the power control 906A switch is closed). The fault indicator 907C may indicate a problem with the circuitry and/or one or more electronic components of the portable water treatment unit 100 (e.g., a short circuit, no data and/or signal received from one or more of the sensors 114 and/or the ozone generator 212). The effective treatment indicator 907D may indicate when data of the one or more sensors 114 is determined by the microcontroller 902 to be within an effective range and/or a safe range. Finally, the low flow indicator 907E may be used to indicate a flow rate that is too low as measured by a flowmeter (e.g., the flowmeter 306 of FIG. 3) and/or where the resistance of the water in the system is too high (e.g., power supplied to the pump 116 is greater than a threshold value indicating the pump may be overworking). An alternative interface comprising the controls 206 and/or indicator 207 may include audible tones, displays such as LCD screens, and connections to wirelessly enabled devices such as smart phones or wearable technology.

FIG. 10 is a portable ozonation unit 1000 that is a specific instance of the portable ozonation unit 200 of FIG. 2, including an enclosure 1015, two fine filters 724A and 724B each having a bypass valve 126A and 126B, respectively, an ozone generator 1008 with an atmosphere assist 1003 and an oxidation chamber 209, and an oxidation-reduction potential sensor 214 communicatively coupled to a microcontroller 902, according to one or more embodiments. Several components of the portable ozonation unit 1000 are housed in the enclosure 1015 for safely. The enclosure 1015 may be a hard metal and/or plastic exterior shell designed for rugged environments. Each of the components are fastened to the enclosure. An additional casing, omitted from FIG. 10 for clarity, may be used to shield electronic components such as a circuit board of the ORP sensor 214 and/or a circuit board containing the corona discharge ozone generator 1008, the microcontroller 902, the power converter 204, and other electronic components. A battery (e.g., the power source 101), also not shown, may be included.

The source water 118 enters the portable ozonation unit 1000 through the tubing 120 of an inlet 1018 (the water may have previously passed one or more coarse filters 722 not shown). The water moves through the pump 116 and is pushed along the tubing 120 through the fine filter 724A and the fine filter 724B, each respectively including the bypass valve 126A and the bypass valve 126B. No instances of the check valve 128 are present in this embodiment. The pump is communicatively coupled to the microcontroller 902. The filtered water is conveyed along the tubing 120 to the oxidation chamber 209 where a corona discharge ozone generator 1008 (e.g., the ozone generator 208 of FIG. 2, the chemical applicator 108 of FIG. 1) creates ozone. A venturi may be used to inject the ozone in the water, in addition the ozone may be directly pumped by pressure supplied by the atmosphere assist 1003 into the oxidation chamber 209 where it is further dispersed into the water.

The treated water leaves the oxidation chamber 209 in the oxidation-resistant tubing 1030 (e.g., the treatment-resistant tubing 130 tailed for ozone as the treatment chemical 110). Before reaching the outlet 1034 as the potable water 134, the treated water passes the ORP sensor 214 that measures oxidation-reduction potential in millivolts as the effectiveness indicator of the ozone treatment. Data of the effectiveness value is conveyed through one or more wires to the microcontroller 902. The microcontroller 902 may then utilize the machine-readable instructions in the memory 106 of the microcontroller to determine whether the sensed and/or measured data is within the effective range, for example by the process of FIG. 5 and FIG. 6. The microcontroller 902 then changes the supply of power to the pump 116 change a first flow rate of the water to a second flow rate that as a result adjusts the concentration of the ozone. The result is a more effective treatment of the source water 118.

As shown and described in conjunction with FIG. 7 and FIG. 8, and throughout this detailed description, the user may activate either instance of the bypass valves 126A and the bypass valve 126B to adapt to a varying environment, source water 118, and/or changing field conditions. Such adjustment may increase dissolved solids and/or particles while also changing the flow rate due to lower flow resistance. The portable ozonation unit 1000 dynamically adjusts to these changes by sensing the effectiveness indicator through the ORP sensor 214 and adjusting power to the pump to ensure the treatment remains effective and the potable water 134 remains safe for human use without excessively depleting the power source 101. Moreover, the portable ozonation unit 1000 accomplishes this flexibility with relatively few components, which may increase reliability in the field, simplify repairs, and maintain operational flexibility where one or more of the filters reach capacity. The interface, filter configuration, bypass system, and automatic flow rate adjustment may create a user-friendly water treatment system for use by a range of technical and non-technical users such as a field geologists, or as an emergency water system that a family may keep in their home in case it is needed in a natural disaster. Additionally, the portable ozone unit 1000 may provide for a lightweight, man-portable solution for water treatment and/or water purification in remote locations, making it ideal for both military and humanitarian missions. Along these lines, FIG. 11 is another illustration of the portable water treatment unit 100 of FIG. 1 that has several additional advantages.

FIG. 11 a specific instance of the portable ozonation unit 300 of FIG. 3 having three fine filters 124 mounted inside an enclosure 1115 and utilizing the ozonation control circuit 900 of FIG. 9 and an ozone module 1108 that utilizes as the ozone generator 208 the electrolytic cell 312 further including the voltmeter 302, the ammeter 304, the flowmeter 306 and one or more operational sensors 114, according to one or more embodiments. For clarity, FIG. 11 omits for clarity the tubing 120 between the pump 116 and the ozone module 1108, including the one or more bypass valves 126.

Similar to FIG. 10, the source water 118 flows through several coarse filters 722, through the pump 116, through one or more fine filters 724 (which also may be bypassed) and through the water treatment unit 108. In the embodiment of FIG. 11, several of the components of the portable water treatment unit 100 are combined to form the ozone module 1108. For example, the ozone module 1108 may contain the ozone generator 208 and sensors 114. Specifically, the ozone module 1108 of FIG. 11 utilizes the electrolytic cell 312 as the ozone generator 208, along with instances of the sensor 114 that are the voltmeter 302, the ammeter 304, and the flowmeter 306. The ozone module 1108 may provide a tight, efficient package for the portable ozonation unit 1100. In the embodiment of FIG. 11, the ozone module used is a DOU model produced by Electrolytic Ozone Incorporated. The DOU uses an active diamond electrode. In conditions of relatively pure water and 1.3 amps of supplied current the DOU may produce: between 0.9 to 1.0 ppm ozone at 0.6 liters per minute flow rate; between 0.46 to 0.56 ppm ozone at 1.0 liters per minute flow rate; and 0.31 to 0.41 ppm ozone at 1.5 liters per minute flow rate. The DOU may include a voltmeter 302, ammeter 304, flowmeter 306, and internal circuitry to generate effectiveness vales based upon operational metrics such as a flow rate that is too low or too high to effectively generate ozone.

Portable ozonation unit 1100 may utilize the ozonation control circuit 900. The microcontroller 902 may receive data and/or signals from the ozone module 1108, including readings from the voltmeter 302, ammeter 304, and/or flowmeter 306 and then use the data and/or signals to adjust power supplied to the pump 116 according to the process shown and described in conjunction with FIG. 5 and FIG. 6, and throughout this detailed description. Additionally, the sensed effectiveness indicator may include additional data related to the effectiveness of the water treatment generated by the ozone module 1108. For example, referring to the ozonation control circuit 900, Pin 17 (P17) may receive a signal in a serial protocol specifying that the ozone module 1108 is has a high flow rate (e.g., an effectiveness indicator that the electrolytic cell 312 may not able to add enough ozone to effectively treat the water), a low flow rate (e.g., an effectiveness indicator that the electrolytic call 312 may be adding more ozone than necessary for the effective treatment), and/or that the flow rate is below a minimum level to produce safe water. Thus, the microcontroller 902 can automatically determine how to adjust the power supplied to the pump 116 and/or change a first flow rate to a second flow rate to ensure that the ozone module 1108 is correctly supplied and continues to produce water that is properly treated, water that is safe for consumption and/or efficient utilization of the power source 101. The microcontroller 902 may also process additional data of the ozone module 1108, for example that the ozone module 1108 is experiencing an operational fault (e.g., a short circuit). Some of this information may be passed directly on to indicators 207. For example, an operational error communicated by the ozone module 1108 may be reflected in the ozone fault indicator 907C of FIG. 9. The result is a comprehensive water treatment system that allows the ozone module 1108 to easily and automatically adapt to changing field conditions, filter usage, and/or varying compositions of source water 118.

Example Use

An example usage of the portable water treatment unit 100, and specifically the portable ozonation unit 1100 will now be described. Sheila Harris is a forest service ranger stationed in a remote mountain cabin in Kings Canyon National Park which is two days hike from the nearest vehicle-accessible road. Sheila is responsible for watching over backpackers that trek through the national park three seasons out of the year. The remote cabin in which Sheila is stationed has a solar array, but no other external power source. Sheila possesses the portable ozonation unit 1100 (e.g., the portable ozonation unit 1100) at the cabin, which is powered by an internal lithium iron phosphate battery. The battery is charged by the solar array when it is depleted. The portable ozonation unit provides enough water for herself, the one or two other rangers that may occasionally work with her at the cabin, and groups of around ten hikers that she may accommodate.

One day in the late summer a frantic trekker, Tom, appears at the cabin. A member of the Tom's party, Brett, has fallen while rock climbing in a remote part of the national park and has seriously injured himself. Brett has a severe laceration, and the rest of Tom and Brett's party is waiting with t. They have run out of iodine tablets, their primary method of water purification.

Sheila radios for a helicopter to evacuate Bret and prepares to set out on foot with Tom to reach Tom's party. Sheila places the portable ozonation unit into a specialized backpack along with her other supplies. Together, the portable ozonation unit and backpack may weigh less than twenty five pounds, allowing Sheila to travel quickly to the Bret's location.

After climbing to a remote rock face at twelve thousand feet, Sheila and Tom reach Tom's party. Bret has a severe gash on his leg, and a significant amount of dirt has entered his wound. Sheila finds a puddle of snowmelt to use as the source water for the portable ozonation unit. Sheila activates the portable ozonation unit and uses the control interface to specify the potable water produced should have a high oxidation-reduction potential (ozone concentration). Being that the water from the snowmelt is relatively pure, Sheila bypasses a 5 micron silver filter to lower resistance of the pump and conserver her energy source. The microcontroller, based upon sensors indicating an effectiveness of the treatment chemical (e.g., ozone), automatically adjusts the pump speed for Sheila's filter configuration and the composition of source water, ensuring the water treatment is effective while conserving the battery. While waiting the requisite sixteen hours for the helicopter evacuation, Tom and Bret's dehydrated party may drink the resulting potable water, and Sheila may also use the product water to disinfect Bret's wound, preventing an infection from developing before he reaches a hospital.

Another example of an ideal use for the portable water treatment unit 100 will now be described. Muteba Contee operates a non-profit humanitarian organization that helps provide medical assistance to remote villages in the jungle of the African nation the Democratic Republic of Congo. Due to outbreaks of cholera and several related gastrointestinal water-borne diseases, effective water treatment is an essential part of his medical assistance program.

However, the villages that Muteba focuses on, often neglected by other non-governmental organizations ("NGOs"), are so remote that they may only contain thirty or forty people. These villages have limited or no ability for vehicles to bring the petrol required for operation of pallet-sized water treatment units that NGOs traditionally employ. In addition, the size of the villages preclude the practical deployment of pallet-sized water treatment units because other non-profits that Muteba works with that supply such units from developed donor nations believe such systems are, on a utilitarian basis, better allocated to larger towns. This is because such units are typically built to support 500 to 10,000 people each. Further, it has been expensive and inefficient to deliver large numbers of personal filtrations systems (such as stand-alone activated carbon filters) and sterilization supplies (such as rubbing alcohol).

Muteba has experienced significant problems from portable ultraviolet treatment systems. Namely, the UV systems may have difficulty penetrating murky water, and the resulting water they produce has no oxidative (disinfectant) properties. The UV bulbs have also frequently burned out after a moderate amount of use. Similarly, reverse osmosis systems are complicated, require lots of power, and include a number of components that may break, and may generate a significant amount of wastewater (with concentrated amounts of dangerous biological organisms) that may further pollute the environment of the villages if carelessly disposed of or introduced back into the watershed. Chemical treatment such as adding chlorine and other chemical oxidizers directly to water supplies has proven difficult, not only for logistical reasons but because it is difficult for some of the villagers to determine how much to add to both effectively treat their water and conserve the treatment chemical.

However, the portable water treatment unit 100, and specifically the portable ozone unit 1100 is perfectly suited to the challenge Muteba faces. The portable ozone unit 1100 may be able to sanitize water with high opacity, even if the filtering system (e.g., the one or more fine filters 724) may clog, via one of several bypasses. The device may support up to 150 people each, meaning that each remote village needs only one or two of the devices. The portable ozone units are also self-sustaining once coupled with a power system such as the solar array, even if no replacement filters (such as the fine filters of FIG. 1) may reach the village being that one or more sensors determine an effectiveness indicator of water moving through the unit and convey data to the internal electronics (e.g., the microcontroller 902) such that the portable ozone unit 1100 automatically adjusts the pump 116 to produce water that is effectively treated. In addition, non-profit workers administering medical assistance to the villages may use the product water to sterilize surgical tools and sanitize wounds. The villagers may also use the product water to sterilize latrines and other areas where the cholera bacteria often resides.

Although the present embodiments have been described with reference to specific example embodiments, it will be evident that various modifications and changes may be made to these embodiments without departing from the broader spirit and scope of the various embodiments. In addition, the process flows depicted in the figures do not require the particular order shown, or sequential order, to achieve desirable results. In addition, other operations may be provided, or operations may be eliminated, from the described flows, and other components may be added to, or removed from, the described systems. Accordingly, other embodiments are within the scope of the following claims.

What is claimed is:

1. A portable water treatment system comprising:
   a pump connected to a tubing and capable of operating at multiple speeds to draw water at multiple flow rates through a source end of the tubing to a product end of the tubing;
   a chemical treatment unit connected to an interstitial section of the tubing, the chemical treatment unit comprising a chemical applicator to deliver a treatment chemical to the water as the water flows through the tubing and past the chemical treatment unit at a flow rate induced by the pump;
   a sensor connected to the tubing and located at least one of at the chemical treatment unit and downstream of the chemical treatment unit to measure an effectiveness value of an effectiveness indicator of the chemical treatment,
      wherein the effectiveness indicator comprises at least one of a concentration of the chemical treatment, an oxidation-reduction potential, a pH, and an operational metric of the chemical treatment unit;
   at least one of a processor and a feedback circuit communicatively coupled to the sensor programmed to compare the effectiveness value of the effectiveness indicator to a reference value to determine an effectiveness of the chemical treatment added to the water by the portable water treatment system;
   a controller communicatively coupled to the at least one of the processor and the feedback circuit programmed to adjust the flow rate of the pump in response to the determination of the effectiveness of the chemical treatment in the water by the at least one of the processor and the feedback circuit; and
   a power source of the portable water treatment system connected to and providing power to at least one of, the pump, the processor, the feedback circuit, the chemical treatment unit, and the controller.

2. The system of claim 1, wherein the chemical treatment is ozone and the chemical treatment unit is an ozone generator that dissolves ozone in the water flow passing the ozone generator.

3. The system of claim 2,
   wherein the ozone generator is an electrolytic cell utilizing a diamond material in at least one of an anode and a cathode of the electrolytic cell.

4. The system of claim 1, wherein the sensor is integrated into the chemical treatment unit.

5. The system of claim 3, wherein the sensor comprises at least one of an ozone concentration sensor and an oxidation-reduction potential probe.

6. The system of claim 1, further comprising:
   An external housing enclosing the pump, the chemical treatment unit, the at least one of the processor and the feedback circuit, and the controller;

one or more instances of a fine filter connected to the tubing upstream of the chemical treatment unit; and
one or more bypass valves routing the water flow drawn through the tubing by the pump around at least one of the one or more instances of the fine filter.

7. The system of claim 1, further comprising:
an oxidation chamber connected to the tubing and receiving ozone of the ozone generator through at least one of a venturi aided by the water flow and an atmosphere assist providing a positive air pressure to aid in dissolving ozone in the water,
   wherein the sensor located at least one of at the chemical treatment unit is located in the oxidation chamber.

8. A portable water treatment apparatus comprising:
a pump connected to a tubing and capable of operating at multiple speeds to draw water at multiple flow rates through a source end of the tubing to a product end of the tubing;
an electrolytic cell for generating ozone connected to an interstitial section of the tubing for delivering an ozone treatment to the water as the water flows through the tubing and past the electrolytic cell at a flow rate induced by the pump;
a sensor connected to the tubing located at least one of at the electrolytic cell and downstream of the electrolytic cell to measure an effectiveness value of an effectiveness indicator of the ozone treatment,
   wherein the effectiveness indicator of the ozone treatment comprises at least one of an operational metric of the electrolytic cell, a current of the electrolytic cell, a voltage of the electrolytic cell, an ozone concentration, and an oxidation-reduction potential;
a microcontroller comprising a processor and a memory, the microcontroller communicatively coupled to the sensor and the pump and programmed to:
   compare the effectiveness value of the effectiveness indicator to a reference value stored in the memory of the microcontroller to determine an effectiveness of the ozone treatment added to the water by the electrolytic cell, and
   adjust the flow rate of the pump in response to the determination of the effectiveness of the ozone treatment in the water by the comparison of the effectiveness value to the reference value; and
a power source of the portable water treatment system connected to and providing power to at least one of the pump, the processor, the electrolytic cell, and the microcontroller.

9. The system of claim 8, wherein at least one of an anode of the electrolytic cell and a cathode of the electrolytic cell comprising a doped diamond material.

10. The system of claim 8, wherein the sensor is integrated into the electrolytic cell.

11. The system of claim 8, wherein the sensor comprising an ozone concentration sensor.

12. The system of claim 8, wherein the sensor comprising an oxidation-reduction potential probe.

13. The system of claim 8, further comprising:
an external housing enclosing the pump, the chemical treatment unit, the at least one of the processor and the feedback circuit, and the controller;
one or more instances of a fine filter connected to the tubing upstream of the electrolytic cell;
one or more bypass valves routing the water flow drawn through the tubing by the pump around at least one of the one or more instances of the fine filter; and
the microcontroller communicatively coupled to the sensor and the pump further operable to:
   determine a current voltage of the power source, and
   disable the pump when the current voltage of the power source is below a threshold voltage.

14. A portable water treatment apparatus comprising:
a pump connected to a tubing and capable of operating at multiple speeds to draw water at multiple flow rates through a source end of the tubing to a product end of the tubing,
an electrolytic cell for generating ozone connected to an interstitial section of the tubing for delivering an ozone treatment to the water as the water flows through the tubing and past the electrolytic cell at a flow rate induced by the pump,
a sensor connected to the tubing located at least one of at the electrolytic cell and downstream of the electrolytic cell to measure an effectiveness value of an effectiveness indicator of the ozone treatment,
   wherein the effectiveness indicator of the ozone treatment comprises at least one of an operational metric of the electrolytic cell, a current of the electrolytic cell, a voltage of the electrolytic cell, an ozone concentration, and an oxidation-reduction potential,
one or more instances of a fine filter connected to the tubing upstream of the electrolytic cell,
one or more bypass valves routing the water flow drawn through the tubing by the pump around at least one of the one or more instances of the fine filter,
a controller comprising a processor and a memory, the controller communicatively coupled with the sensor and the pump and the memory comprising computer-readable instructions that when executed on the processor cause the processor to adjust to deactivation of one or more bypass valves routing the water through the one or more instances of the fine filter by:
   comparing the effectiveness value of the effectiveness indicator to a reference value stored in the memory of the microcontroller to determine an effectiveness of the ozone treatment added to the water by the electrolytic cell, and
   adjusting the flow rate of the pump in response to the determination of the effectiveness of the ozone treatment in the water by the comparison of the effectiveness value to the reference value,
a power source of the portable water treatment system connected to and providing power to at least one of the pump, the processor, the feedback circuit, the electrolytic cell, and the controller.

15. The system of claim 14, wherein the memory further comprising computer readable instructions that when executed on the processor causes the processor to:
   determine a current voltage of the power source, and
   disable the pump when the current voltage of the power source is below a threshold voltage.

16. The system of claim 15, wherein the sensor comprising an ozone concentration sensor.

17. The system of claim 15, wherein the sensor comprising an oxidation-reduction potential probe.

* * * * *